(12) United States Patent
Gwak et al.

(10) Patent No.: US 11,809,627 B2
(45) Date of Patent: Nov. 7, 2023

(54) TACTILE STIMULATION PROVIDING DEVICE

(71) Applicant: BHAPTICS INC., Daejeon (KR)

(72) Inventors: Kiuk Gwak, Daejeon (KR); Younghun Ko, Daejeon (KR); Wonho Yu, Daejeon (KR)

(73) Assignee: BHAPTICS INC., Daejeon (KR)

( * ) Notice: Subject to any disclaimer, the term of this patent is extended or adjusted under 35 U.S.C. 154(b) by 56 days.

(21) Appl. No.: 17/519,308

(22) Filed: Nov. 4, 2021

(65) Prior Publication Data

US 2022/0066563 A1 Mar. 3, 2022

Related U.S. Application Data

(62) Division of application No. 16/192,507, filed on Nov. 15, 2018, now Pat. No. 11,209,904.

(30) Foreign Application Priority Data

Dec. 29, 2017 (KR) .......................... 10-2017-0183617
Jun. 27, 2018 (KR) .......................... 10-2018-0074358

(51) Int. Cl.
*G06F 3/01* (2006.01)
*A61H 11/00* (2006.01)

(52) U.S. Cl.
CPC .............. *G06F 3/016* (2013.01); *A61H 11/00* (2013.01); *A61H 2201/165* (2013.01)

(58) Field of Classification Search
CPC ........... G06F 3/016; G06F 3/01; A61H 11/00; A61H 2201/165; A61H 23/0263; G08B 6/00; A41D 1/002; A41D 1/04; A41D 2400/322; A41D 13/08
See application file for complete search history.

(56) References Cited

U.S. PATENT DOCUMENTS

| | | | | |
|---|---|---|---|---|
| 2005/0113724 A1* | 5/2005 | Wriggle | ................. | A61H 23/02 601/46 |
| 2009/0143704 A1* | 6/2009 | Bonneau | ............... | A61F 5/0111 600/595 |
| 2017/0178471 A1* | 6/2017 | Levesque | ............... | A41D 1/002 |
| 2017/0281054 A1* | 10/2017 | Stever | .................... | A61B 5/349 |
| 2018/0348868 A1* | 12/2018 | Lee | ...................... | H04M 19/047 |

* cited by examiner

*Primary Examiner* — Quang D Thanh
(74) *Attorney, Agent, or Firm* — IP & T GROUP LLP

(57) ABSTRACT

A tactile stimulation providing device includes: a wearing part having a first side and a second side that is the opposite side of the first side, wherein actuators are disposed between the first side and the second side; a first main band having one end located in the vicinity of the first side of the wearing part and the other end fastenable to the vicinity of the second side of the wearing part; and a sub-band having one end located in the vicinity of a third side of the wearing part and the other end fastenable to the vicinity of the third side of the wearing part.

19 Claims, 34 Drawing Sheets

FIG. 33
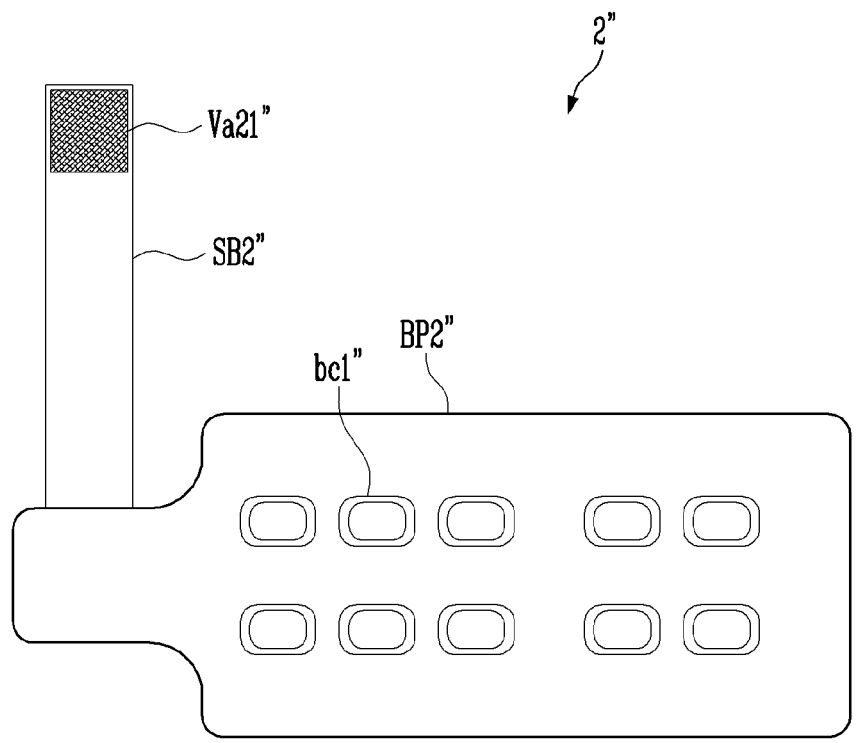
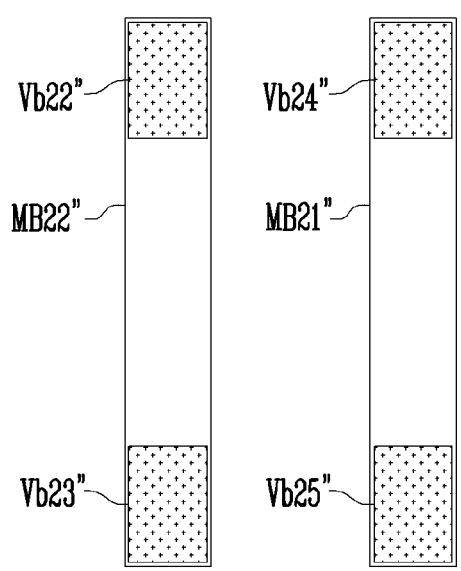

TACTILE STIMULATION PROVIDING DEVICE

CROSS-REFERENCE TO RELATED APPLICATION

The present application is a divisional of U.S. patent application Ser. No. 16/192,507 filed on Nov. 15, 2018, which claims priority under 35 U.S.C. § 119(a) to Korean patent application 10-2017-0183617 filed on Dec. 29, 2017 and Korean patent application 10-2018-0074358 filed on Jun. 27, 2018 in the Korean Intellectual Property Office, the entire disclosure of which is incorporated herein by reference.

BACKGROUND

1. Technical Field

The present disclosure generally relates to a tactile stimulation providing device.

2. Related Art

A tactile stimulation providing device includes actuators, and selectively vibrates the actuators, thereby providing a tactile stimulation to a user.

The tactile stimulation providing device may be provided suitable for various body parts of a desired user.

However, the user may not only use a corresponding body part to simply feed a tactile stimulation, but also use the corresponding body part as an input means through a touch, a motion, etc. Therefore, the tactile stimulation providing device should be properly provided in a structure that does not provide inconvenience to an input action of the user. In addition, even when the input action of the user becomes intense, the user's wearing of the tactile stimulation providing device is not released, and the actuators should be adhered closely to a desired body part.

Also, the user may wear the tactile stimulation providing device on clothes including socks, gloves, shoes, and the like, in addition to a case where the user simply wears the tactile stimulation providing device directly on a body part. Therefore, in the tactile stimulation providing device, its size should be easily changed depending on situation, and the actuators should be adhered closely to a desired body part.

SUMMARY

Embodiments provide a tactile stimulation providing device that facilitates changing of its size, is firmly fixed to a body part of a user, and does not interfere with an input action of the user.

According to an aspect of the present disclosure, there is provided a tactile stimulation providing device including: a wearing part having a first side and a second side that is the opposite side of the first side, wherein actuators are disposed between the first side and the second side; a first main band having one end located in the vicinity of the first side of the wearing part and the other end fastenable to the vicinity of the second side of the wearing part; and a sub-band having one end located in the vicinity of a third side of the wearing part and the other end fastenable to the vicinity of the third side of the wearing part.

When the first main band is fastened, the first main band and the actuators may form a ring shape to be adhered closely to a first body part of a user. When the sub-band is fastened, the sub-band may autonomously form a ring shape to be adhered closely to a second body part of the user. The first body part and the second body part may be adjacent body parts connected to each other through a joint.

The wearing part may include: a first layer member; and a second layer member having at least a portion of an edge, which is coupled to the first layer member on the first layer member. The actuators may be disposed to be adhered closely to the first layer member.

The tactile stimulation providing device may further include: bottom cases adhered closely to a lower surface of the first layer member; and top cases adhered closely to an upper surface of the first layer member, the top cases being coupled to the corresponding bottom cases to fix the corresponding actuators.

The tactile stimulation providing device may further include: a first A-type attachable/detachable member disposed at a lower surface of the sub-band; and a first B-type attachable/detachable member disposed at an upper surface of the second layer member. When attachable/detachable members have different types, the attachable/detachable members may be attachable to/detachable from each other.

The wearing part may further include a third layer member having one end connected to the second layer member on the second layer member. The tactile stimulation providing device may further include a second A-type attachable/detachable member disposed at a lower surface in the vicinity of the other end of the third layer member.

The tactile stimulation providing device may further include a controller case fitted into the third layer member.

The second layer member may include a first wiring opening, the third layer member may include a second wiring opening, and the controller case may include a third wiring opening. The actuators and a controller in the controller case may be electrically connected by a wiring through the first wiring opening, the second wiring opening, and the third wiring opening.

The tactile stimulation providing device may further include: a second B-type attachable/detachable member located at an upper surface in the vicinity of the other end of the first main band; and a third A-type attachable/detachable member located at a lower surface in the vicinity of the other end of the first main band.

The third A-type attachable/detachable member may be attached to the first B-type attachable/detachable member, so that the first main band and the actuators form a ring shape.

The second A-type attachable/detachable member may be simultaneously attached to the first B-type attachable/detachable member and the second B-type attachable/detachable member.

The first A-type attachable/detachable member may be attached to the first B-type attachable/detachable member in the vicinity of the third side of the wearing part such that the sub-band autonomously forms a ring shape.

The actuators may be grouped into at least two groups. Actuators of a first group may be spaced apart from each other at a first distance in a first direction, and actuators of a second group may be spaced apart from each other at a second distance in the first direction. In the first direction, a minimum distance between the actuator of the first group and the actuator of the second group may be longer than the first distance and the second distance.

The first main band may have the one end located in the vicinity of the first side of the wearing part and the other end located in the vicinity of the second side of the wearing part to overlap with at least some of the actuators of the first group. The tactile stimulation providing device may further include a second main band having one end located in the vicinity of the first side of the wearing part and the other end located in the vicinity of the second side of the wearing part to overlap with at least some of the actuators of the second group.

The tactile stimulation providing device may further include a third B-type attachable/detachable member located at an upper surface in the vicinity of the other end of the third layer member.

The tactile stimulation providing device may further include: a fourth B-type attachable/detachable member located at an upper surface in the vicinity of the one end of the third layer member; a fifth B-type attachable/detachable member located at an upper surface in the vicinity of the one end of the first main band; and a fourth A-type attachable/detachable member located at a lower surface in the vicinity of the one end of the first main band.

The tactile stimulation providing device may further include: a first strap located at an upper surface in the vicinity of the one end of the sub-band; an A-type fastening member connected to the first strap; a second strap located at an upper surface in the vicinity of the other end of the sub-band; and a B-type fastening member connected to the second strap. When fastening members have different types, the fastening members may be fastenable to each other.

The tactile stimulation providing device may further include: a second B-type attachable/detachable member located at a lower surface in the vicinity of the one end of the second main band; a third A-type attachable/detachable member located at an upper surface in the vicinity the one end of the second main band; a third B-type attachable/detachable member located at a lower surface in the vicinity of the other end of the second main band; and a fourth A-type attachable/detachable member located at an upper surface in the vicinity of the other end of the second main band.

The tactile stimulation providing device may further include: a fourth B-type attachable/detachable member located at a lower surface in the vicinity of the one end of the first main band; a fifth A-type attachable/detachable member located at an upper surface in the vicinity of the one end of the first main band; a fifth B-type attachable/detachable member located at a lower surface in the vicinity of the other end of the first main band; and a sixth A-type attachable/detachable member located at an upper surface in the vicinity of the other end of the first main band.

The tactile stimulation providing device may further include: a first strap located at an upper surface in the vicinity of the one end of the sub-band; an A-type fastening member connected to the first strap; a second strap located at an upper surface in the vicinity of the other end of the sub-band; and a B-type fastening member connected to the second strap. When fastening members have different types, the fastening members may be fastenable to each other.

According to another aspect of the present disclosure, there is provided a tactile stimulation providing device including: actuators providing a tactile stimulation; a controller controlling the actuators; a controller case including the controller therein; a bolt protruding in a vertical direction at an upper portion of the controller case; a motion tracker fitted around the bolt, the motion tracker sensing a motion of a user; and an angle adjusting member fitted around the bolt, the angle adjusting member being located between the controller case and the motion tracker.

The angle adjusting member may be an angle adjusting nut.

The angle adjusting nut may include a rotating support.

The angle adjusting member may be a washer assembly.

The washer assembly may include rubber washers and at least one metal washer located between the rubber washers.

According to still another aspect of the present disclosure, there is provided a tactile stimulation providing device including: actuators providing a tactile stimulation; a controller controlling the actuators; a controller case including the controller therein; a tracker supporting member having a portion fastenable to the controller case; and a motion tracker fastenable to another portion of the tractor supporting member, the motion tracker sensing a motion of a user.

The tactile stimulation providing device may further include: a bolt coupling the motion tracker to another portion of the tracker supporting member; and an angle adjusting member fitted around the bolt.

BRIEF DESCRIPTION OF THE DRAWINGS

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the example embodiments to those skilled in the art.

In the drawing figures, dimensions may be exaggerated for clarity of illustration. It will be understood that when an element is referred to as being "between" two elements, it can be the only element between the two elements, or one or more intervening elements may also be present. Like reference numerals refer to like elements throughout.

FIG. 33 is a view illustrating another modification of the tactile stimulation providing device of the second embodiment.

DETAILED DESCRIPTION

Figure 1:
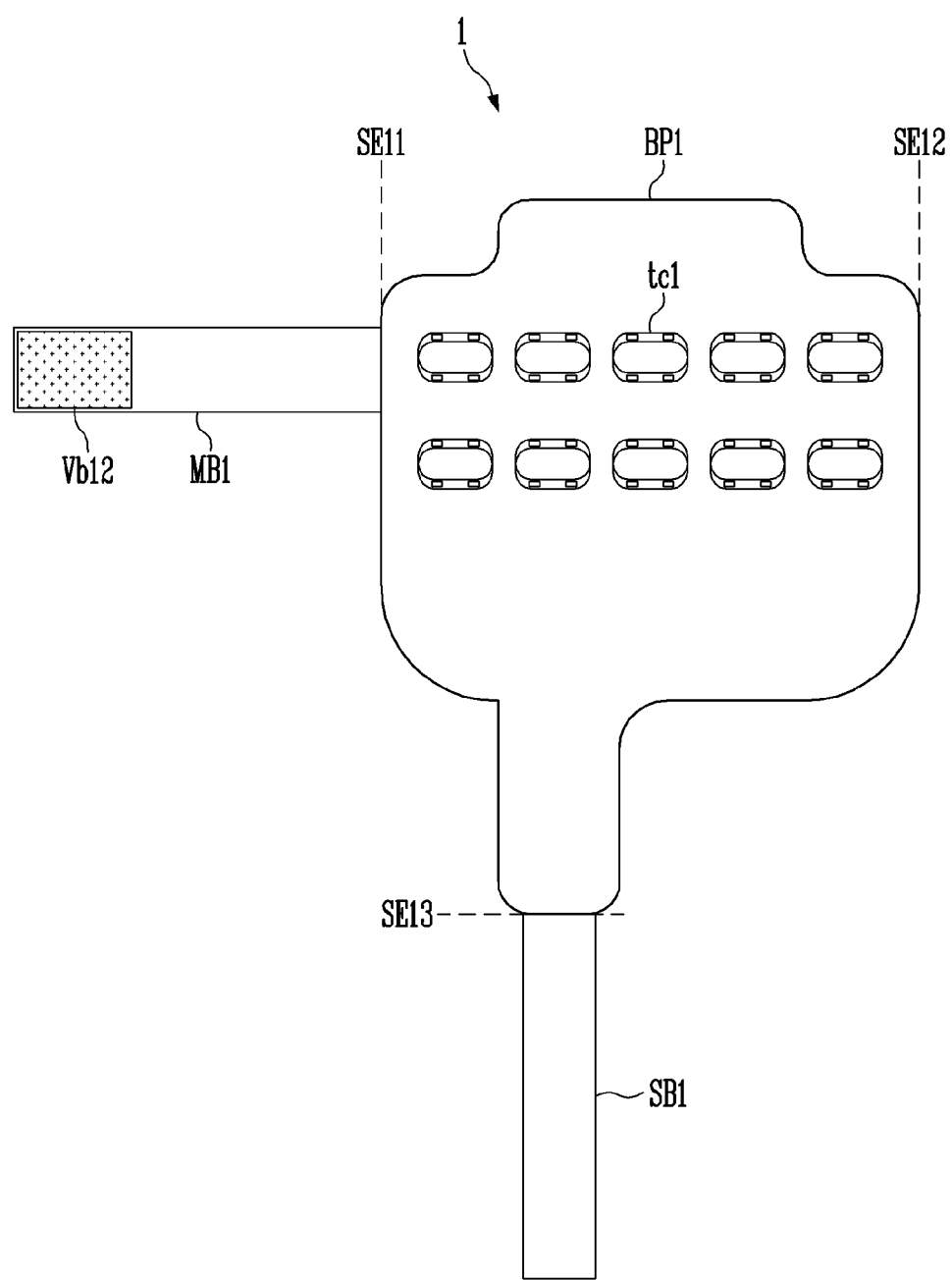
FIG. 1 is a view illustrating an upper surface of a first layer member of a tactile stimulation providing device according to a first embodiment of the present disclosure.

Hereinafter, exemplary embodiments are described in detail with reference to the accompanying drawings so that those skilled in the art may easily practice the present disclosure. The present disclosure may be implemented in various different forms and is not limited to the exemplary embodiments described in the present specification.

A part irrelevant to the description will be omitted to clearly describe the present disclosure, and the same or similar constituent elements will be designated by the same reference numerals throughout the specification. Therefore, the same reference numerals may be used in different drawings to identify the same or similar elements.

In addition, the size and thickness of each component illustrated in the drawings are arbitrarily shown for better understanding and ease of description, but the present disclosure is not limited thereto. Thicknesses of several portions and regions are exaggerated for clear expressions.

FIG. 1 is a view illustrating an upper surface of a first layer member of a tactile stimulation providing device according to a first embodiment of the present disclosure.

Referring to FIG. 1, the tactile stimulation providing device 1 according to the first embodiment of the present disclosure includes a first layer member BP1, a main band MB1, and a sub-band SB1.

A wearing part is a part that is worn on a first body part of a user, to which a tactile stimulation is to be provided. The wearing part of this embodiment may be configured in a triple layer structure, and the first layer member BP1 in the triple layer structure will be first described in FIG. 1.

The first layer member BP1 may be made of a flexible material such as cloth, rubber or plastic. The shape and size of the first layer member BP1 may be determined suitable for the first body part of the user. The first layer member BP1 is used to allow actuators to be adhered closely to the first body part of the user while supporting the actuators. In the first embodiment, the first body part may be a top side of a foot of the user.

The actuators may be disposed between a first side SE11 of the first layer member BP1, i.e., the wearing part and a second side SE12 that is the opposite side of the first side SE11. Since the actuators are covered by top cases tc1, the actuators are not shown in FIG. 1. The top cases tc1 are adhered closely to the upper surface of the first layer member BP1, and are coupled to corresponding bottom cases to fix corresponding actuators ac1.

The first main band MB1 may be made of an elastic material such as cloth, rubber or plastic. One end of the first main band MB1 is located in the vicinity of the first side SE11 of the wearing part, and the other end of the first main band MB1 is fastenable to the vicinity of the second side SE12 of the wearing part. The fastening of the other end of the first main band MB1 will be described later with reference to FIG. 9. When the first main band MB1 is fastened, the first main band MB1 and the actuators may form a ring shape to be adhered closely to the first body part of the user.

The sub-band SB1 may be made of an elastic material such as cloth, rubber or plastic. One end of the sub-band SB1 is located in the vicinity of a third side SE13, and the other end of the sub-band SB1 is fastenable to the vicinity of the third side SE13. The fastening of the other end of the sub-band SB1 will be described later with reference to FIG. 12. When the sub-band SB1 is fastened, the sub-band SB1 may autonomously form a ring shape to be adhered closely to a second body part of the user. The first body part and the second body part may be adjacent body parts connected to each other through a joint. As described above, when the first body part is the top side of the foot of the user, the second body part may correspond to an ankle of the user. According to an embodiment of the present disclosure, the sub-band SB1 may be fixed at the second body part such that the ring-shaped wearing part surrounding the first body part is not rotated (slipped) in an undesired direction.

A second B-type attachable/detachable member Vb12 may be located at an upper surface in the vicinity of the other end of the first main band MB1.

Hereinafter, an A-type attachable/detachable member and a B-type attachable/detachable member are described. When attachable/detachable members have different types, the attachable/detachable members may be attachable to/detachable from each other. When attachable/detachable members have the same type, the attachable/detachable members may not be attachable to/detachable from each other. The attachable/detachable member may be variously configured with a bolt/nut, a button/buttonhole, etc. Hereinafter, a case where the attachable/detachable member is a Velcro material will be assumed and described in this embodiment.

In addition, as described above, the terms "vicinity" of the first side SE11, "vicinity" of the second side SE12, and "vicinity" of the third side SE13 are used. The term "vicinity" is an expression since, when a band is connected to the wearing part, the band is not necessarily sewed at an edge of the wearing part, but may be sewed at an arbitrary area in the vicinity of the edge or be attachable to/detachable from the arbitrary area. The range of the term "vicinity" may mean up to an area in which the effect according to the structure of this embodiment can equally/similarly appear. For example, in a case where the one end of the first main band MB1 is connected between arbitrary actuator cases tc1 excessively beyond the vicinity of the first side SE11, an actuator excluded from the formed ring shape exists when the other end of the first main band MB1 is attached to the vicinity of the second side SE12. This actuator case cannot be adhered closely to the first body part of the user, and hence a tactile stimulation cannot be properly transferred. Therefore, it cannot be seen that the one end of the main band MB1 has been connected to the vicinity of the first side SE11.

Figure 2:
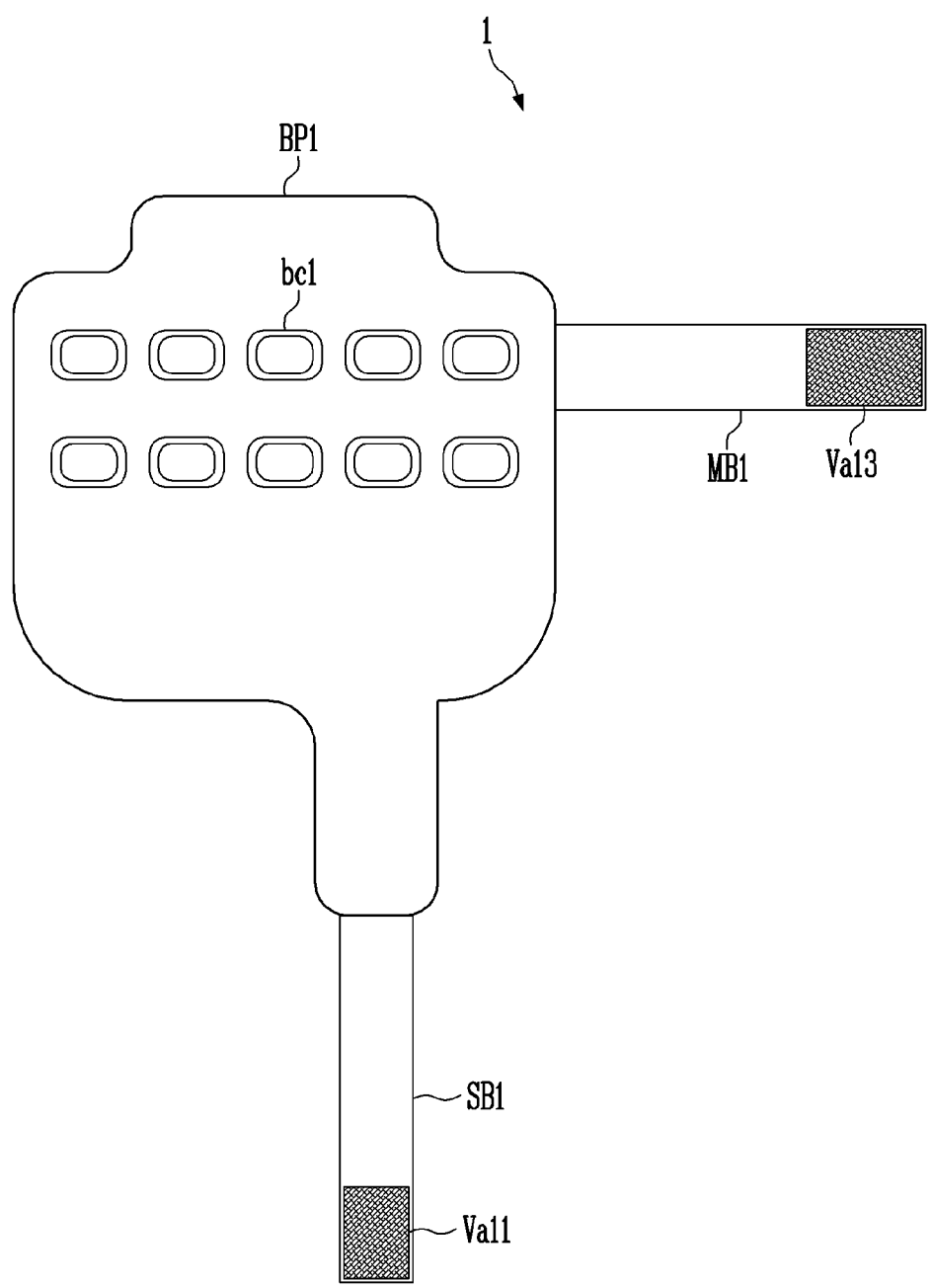
FIG. 2 is a view illustrating a lower surface of the first layer member of the tactile stimulation providing device according to the first embodiment of the present disclosure.

FIG. 2 is a view illustrating a lower surface of the first layer member of the tactile stimulation providing device according to the first embodiment of the present disclosure.

Referring to FIG. 2, bottom cases bc1 may be disposed at the lower surface of the first layer member BP1 to be adhered closely to the lower surface of the first layer member BP1. The bottom cases bc1 are coupled to the corresponding top cases tc1 to fix the actuators. The relationship between an actuator and actuator cases will be described in more detail later with reference to FIGS. 3 and 4.

A third A-type attachable/detachable member Va13 may be located at a lower surface in the vicinity of the other end of the first main band MB1.

A first A-type attachable/detachable member Va11 may be located at a lower surface in the vicinity of the other end of the sub-band SB1.

Figure 3:
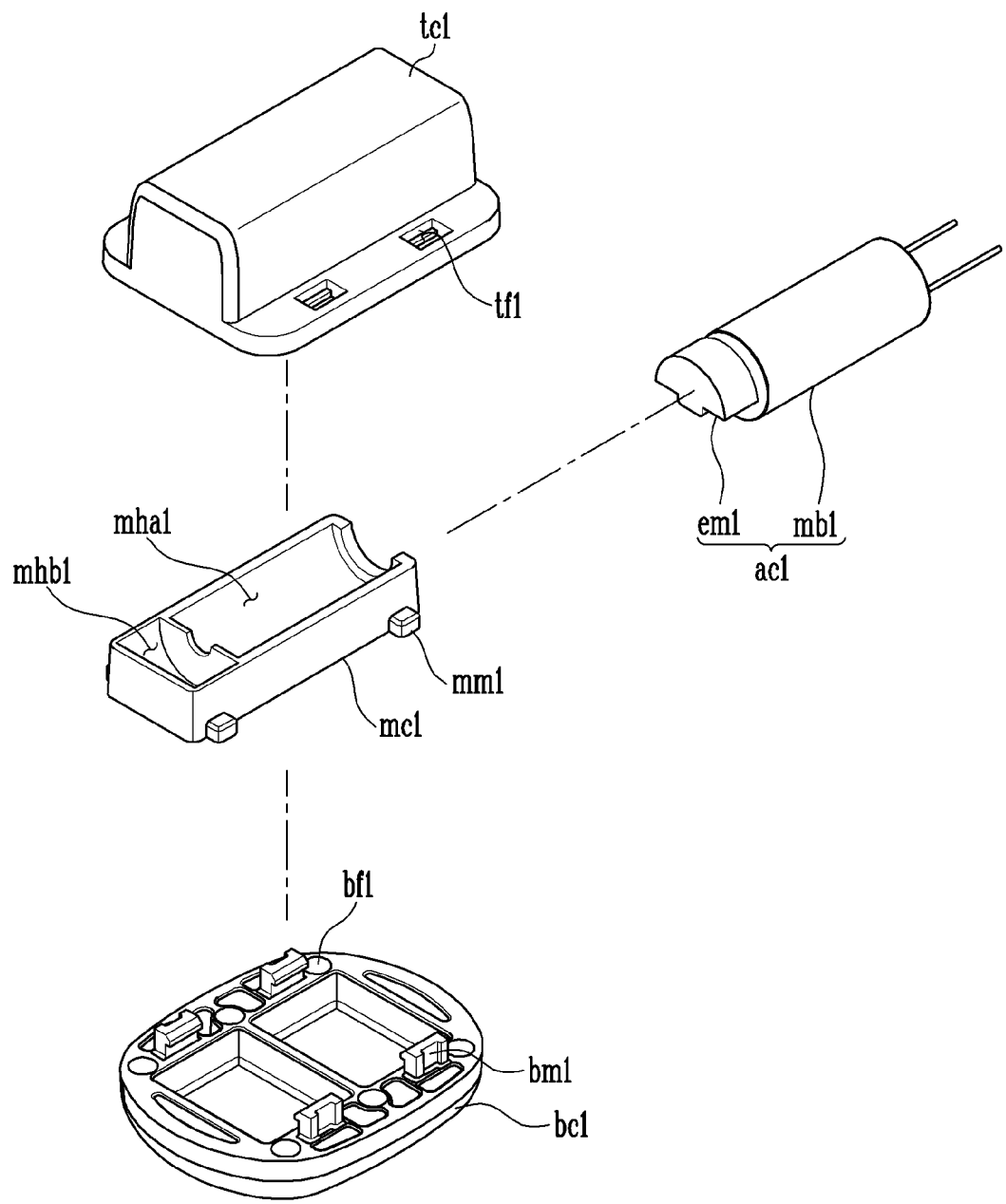
FIGS. 3 and 4 are views illustrating an actuator assembly at different visual points according to an embodiment of the present disclosure.
Figure 4:
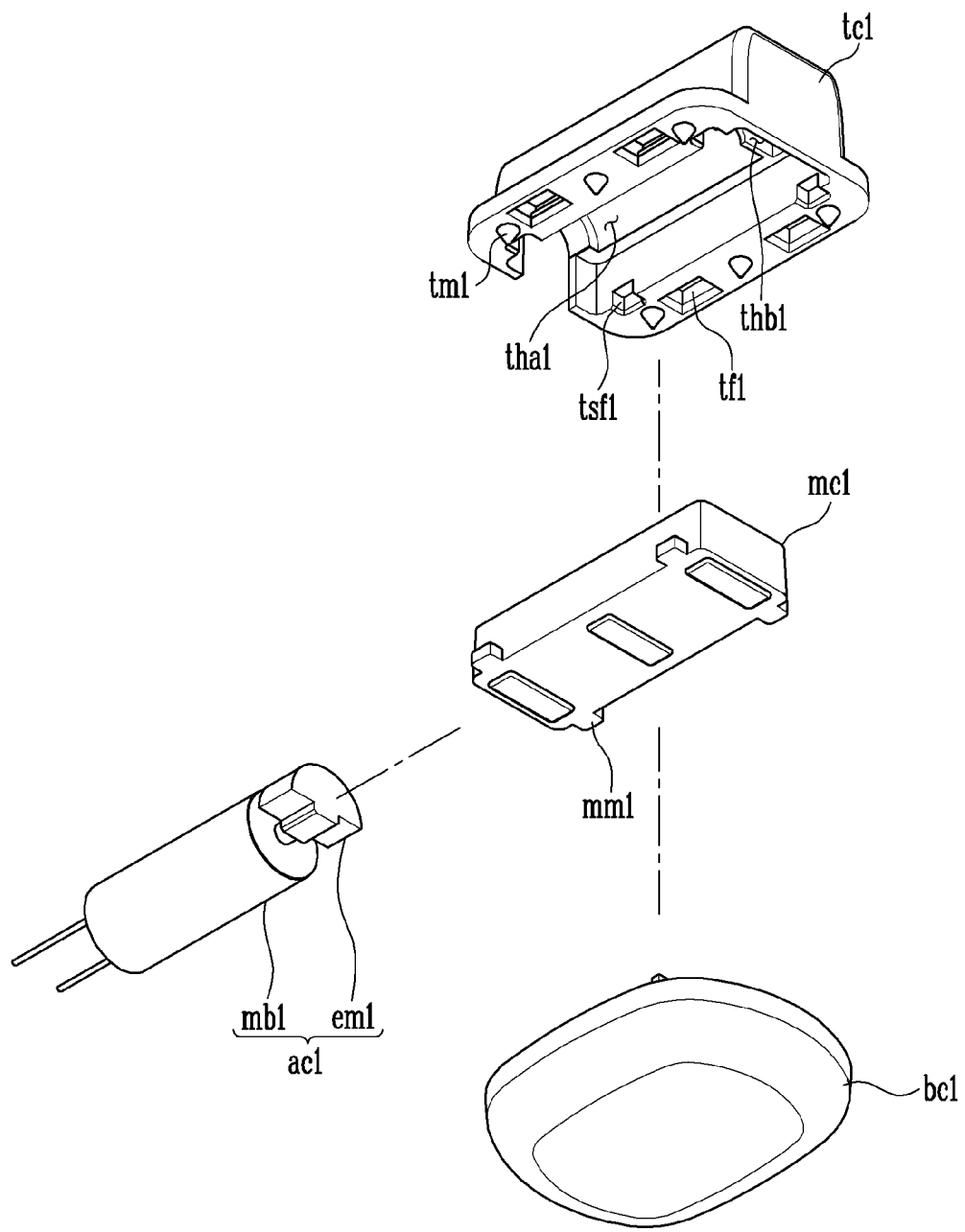

FIGS. 3 and 4 are views illustrating an actuator assembly at different visual points according to an embodiment of the present disclosure.

Referring to FIGS. 3 and 4, the actuator assembly AA1 according to the embodiment of the present disclosure includes an actuator ac1, a top case tc1, a cover case mc1, and a bottom case bc1.

The actuator ac1 may include a driver mb1 and an eccentric mass em1. The driver mb1 and the eccentric mass em1 may be rotatably connected through a shaft. For example, the actuator ac1 may be an Eccentric Rotating Mass (ERM) motor. The actuator ac1 may create vibration when the eccentric mass em1 rotated by the driver mb1 serves as an asymmetric vibrator. For example, the actuator ac1 may be a cylindrical vibration motor in which the diameter of a cylinder is about 6 mm and the entire height is about 17 mm. While a coin-shaped motor creates vibration in a horizontal direction when a vibrator is horizontally rotated, the actuator ac1 of this embodiment may create vibration in a vertical direction.

The top case tc1 includes an accommodating part tha1 for accommodating the driver mb1 and an accommodating part thb1 for accommodating the eccentric mass em1. That is, the top case tc1 may accommodate the whole or a portion of the actuator ac1 except wirings. In some embodiments, when the top case tc1 accommodates only a portion of the actuator ac1, the other portion of the actuator ac1 may be accommodated by the cover case mc1.

The cover case mc1 is coupled to the top case tc1 such that the driver mb1 is adhered closely to an accommodating part mha1. The cover case mc1 may be coupled to the top case tc1 while the actuator ac1. As a male fastening part mm1 of the cover case mc1 is fitted into a female fastening part tsf1 of the top case tc1, the cover case mc1 may be firmly fixed to the top case tc1. In particular, the accommodating part tha1 and the accommodating part mha1 may be formed such that the driver mb1 of the actuator ac1 is firmly fixed. The male fastening part mm1 of the cover case mc1 may protrude to be parallel to a surface on which the cover case mc1 is in contact with the first layer member BP1. In this embodiment, four pairs of male fastening parts and female fastening parts are provided. However, in some embodiments, the number of male fastening parts and female fastening parts may be changed.

The cover case mc1 is coupled to the top case tc1, to form, together with an accommodating part mhb1, an extra rotating space of the eccentric mass em1 while allowing the eccentric mass em1 to be spaced apart from the upper surface of the first layer member BP1. That is, the accommodating part mhb1 of the cover case mc1 is matched to the accommodating part thb1, to form an extra rotating space that does not interfere with the rotation of the eccentric mass em1. Also, the accommodating part mhb1 of the cover case mc1 functions to allow the eccentric mass em1 to be spaced apart from the upper surface of the first layer member BP1. Thus, even when the first layer member BP1 is made of a flexible material such as cloth or rubber, the eccentric mass em1 can be reliably rotated without collision with the first layer member BP1.

The bottom case bc1 is located at the lower surface of the first layer member BP1, and fixes the top case tc1 to the upper surface of the first layer member BP1.

A male fastening part bm1 of the bottom case bc1 is coupled to a female fastening part tf1 of the top case tc1 by penetrating the first layer member BP1, so that the actuator ac1 and the cases bc1, mc1, and tc1 thereof can be fixed to the first layer member BP1. The first layer member BP1 may include an opening through which the male fastening part bm1 can pass.

The top case tc1 may include a projection tm1, and the bottom case bc1 may include a recess part bf1. The projection tm1 of the top case tc1 is fitted into the recess part hf1 by pressurizing the first layer member BP1, so that the actuator ac1 and the cases bc1, mc1, and tc1 thereof can be more firmly fixed to the first layer member BP1.

Figure 5:
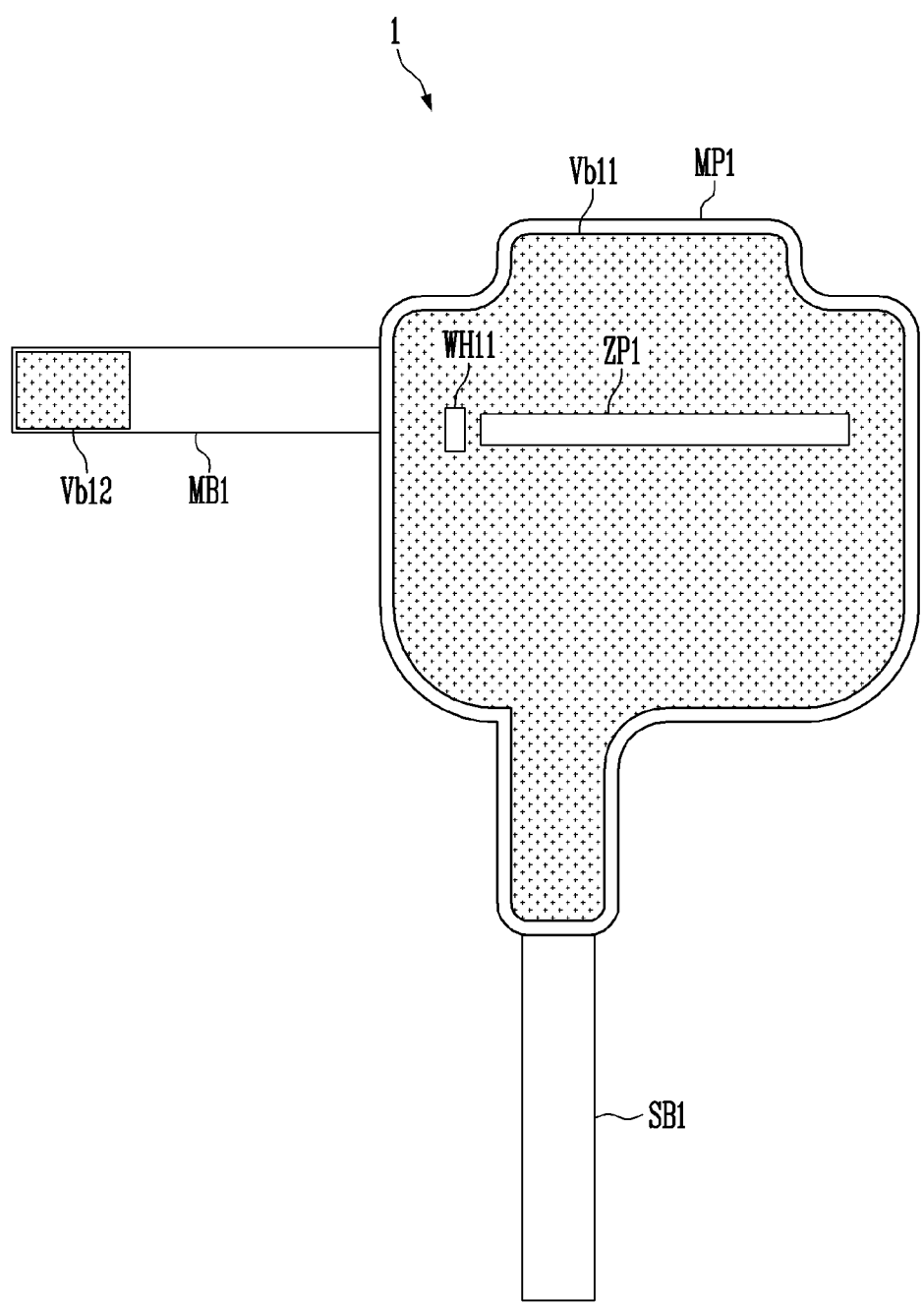
FIG. 5 is a view illustrating an upper surface of a second layer member of the tactile stimulation providing device according to the first embodiment of the present disclosure.

FIG. 5 is a view illustrating an upper surface of a second layer member of the tactile stimulation providing device according to the first embodiment of the present disclosure.

Referring to FIG. 5, the second layer member MP1 is illustrated, which has at least a portion of an edge, which is coupled to the first layer member BP1 on the first layer member BP1. Since the first layer member BP1 is covered by the second layer member MP1, the first layer member BP1 is not shown in FIG. 5.

The second layer member MP1 may be made of a flexible material such as cloth, rubber or plastic. The shape and size of the second layer member MP1 may correspond to those of the first layer member BP1.

The second layer member MP1 functions to cover the top cases tc1 and wirings extending therefrom from eyes of the user. The second layer member MP1 includes a first wiring opening WH11, and the wirings can be gathered and neatly extracted through the first wiring opening WH11. The second layer member MP1 may selectively further include a zipper member ZP1 as a path for organizing the actuators and the wirings.

A first B-type attachable/detachable member Vb11 may be disposed at the upper surface of the second layer member MP1. The size and shape of the first B-type attachable/detachable member Vb11 may correspond to those of the second layer member MP1. In another embodiment, the first B-type attachable/detachable member Vb11 may be formed to have a minimum area only in the vicinity of the second side SE12 and the vicinity of the third side SE13.

Figure 6:
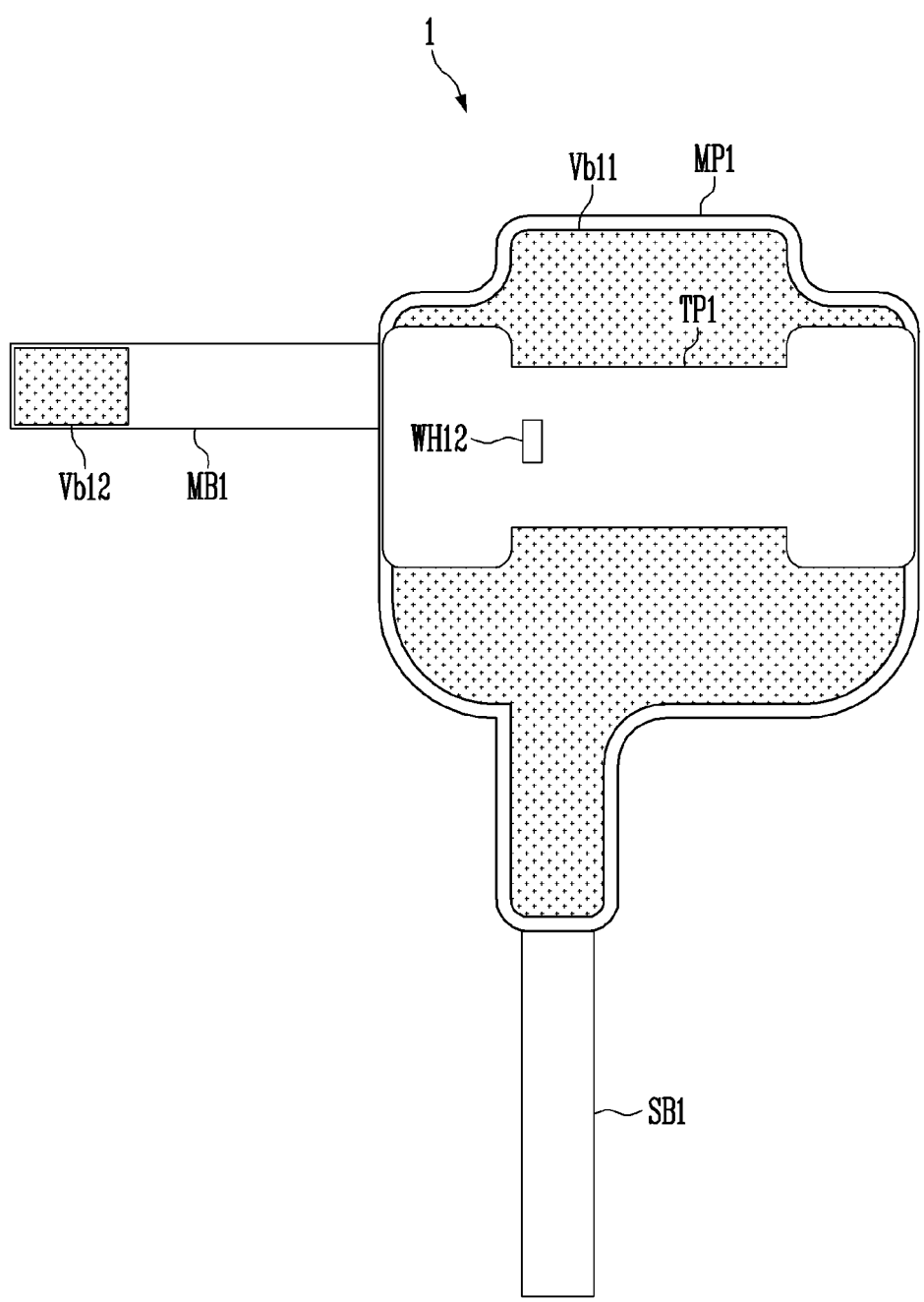
FIG. 6 is a view illustrating an upper surface of a third layer member of the tactile stimulation providing device according to the first embodiment of the present disclosure.

FIG. 6 is a view illustrating an upper surface of a third layer member of the tactile stimulation providing device according to the first embodiment of the present disclosure.

Referring to FIG. 6, the third layer member TP1 is illustrated, which has one end connected to the second layer member MP1 on the second layer member MP1.

The third layer member TP1 may be made of a flexible material such as cloth, rubber or plastic. Unlike the second layer member MP1, the shape and size of the third layer member TP1 may not correspond to those of the first layer member BP1.

The third layer member TP1 may include a second wiring opening WH12. The third layer member TP1 may be configured to again extract the wirings extracted from the first wiring opening WH11 through the second wiring opening WH12 while covering the wirings from the eyes of the user.

Figure 7:
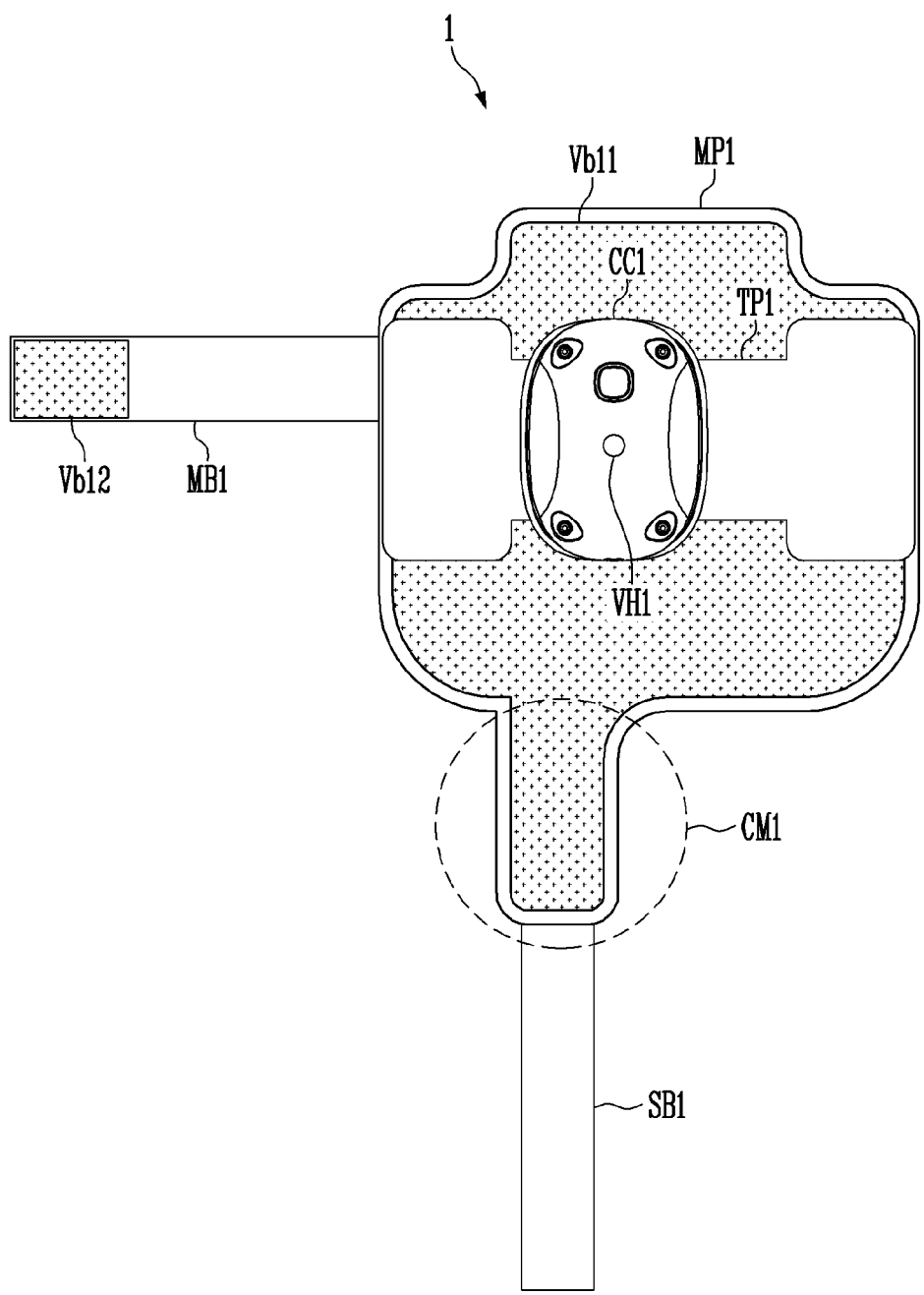
FIG. 7 is a view illustrating a controller case of the tactile stimulation providing device according to the first embodiment of the present disclosure.

FIG. 7 is a view illustrating a controller case of the tactile stimulation providing device according to the first embodiment of the present disclosure.

Referring to FIG. 7, the controller case CC1 fitted into the third layer member TP1 is illustrated. Further referring to FIG. 8, the width of the third layer member TP1 is configured narrower than that of a lower end opening of the controller case CC1, so that the controller case CC1 can be fitted into the third layer member TP1 in the length direction.

In some embodiments, the controller case CC1 may further include a bolt insertion opening VH1 at an upper end thereof.

Figure 8:
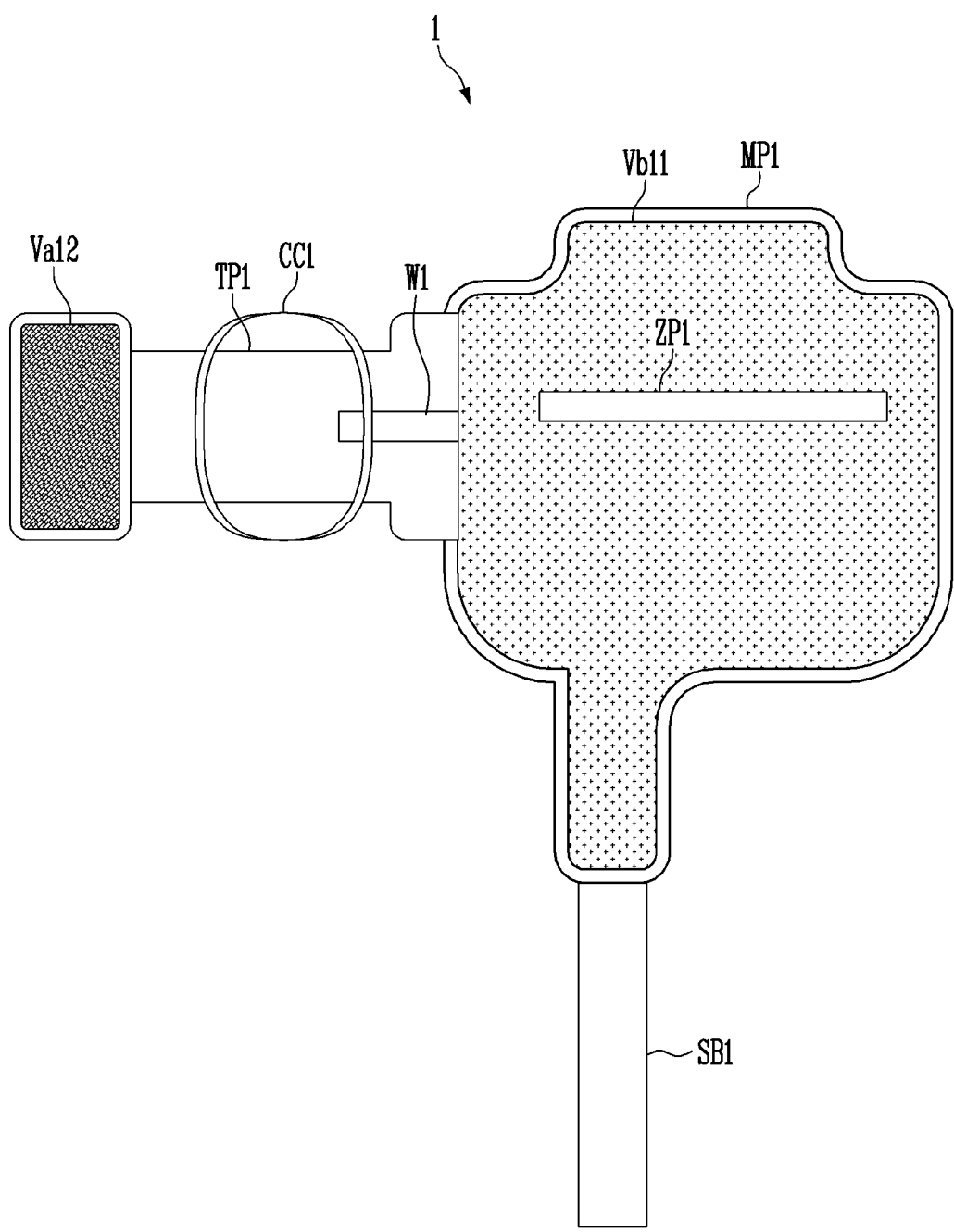
FIG. 8 is a view illustrating a lower surface of the third layer member of the tactile stimulation providing device according to the first embodiment of the present disclosure.

FIG. 8 is a view illustrating a lower surface of the third layer member of the tactile stimulation providing device according to the first embodiment of the present disclosure.

Referring to FIG. 8, a case where a wiring W1 faces the controller case CC1 by passing through the first wiring opening WH11 and the second wiring opening WH12 is illustrated. Although not shown in the drawing, the controller case CC1 may further include a third wiring opening at a lower surface thereof. Thus, the actuators ac1 and a controller in the controller case CC1 can be electrically connected by a wiring through the first wiring opening WH11, the second wiring opening WH12, and the third wiring opening.

The controller is located in the controller case CC1, and may generate a driving signal corresponding to the actuators ac1. The controller may be configured to include a microcontroller, a motor driver, a power management module, and the like. A separate battery for driving the controller may be located in the controller case CC1. The controller may be configured in the form of a Printed Circuit Board (PCB), a Flexible Printed Circuit Board (FPCB), an Integrated Circuit (IC), etc. Also, the controller may receive a tactile stimulation pattern input through the existing wireless communication technology including Bluetooth, Wi-Fi, and the like, or the existing wired communication technology. The tactile stimulation pattern may be a multidirectional tactile stimulation pattern. A separate memory device may be located in the controller case CC1.

The wiring W1 may transfer a driving signal from the controller to the actuators ac1. The wiring W1 may be configured with an FPCB, a wire, etc.

Also, referring to FIG. 8, a second A-type attachable/detachable member Va12 may be disposed at a lower surface in the vicinity of the other end of the third layer member TP1.

FIGS. 9 to 12 are views illustrating a wearing procedure of the tactile stimulation providing device according to the first embodiment of the present disclosure.

Figure 9:
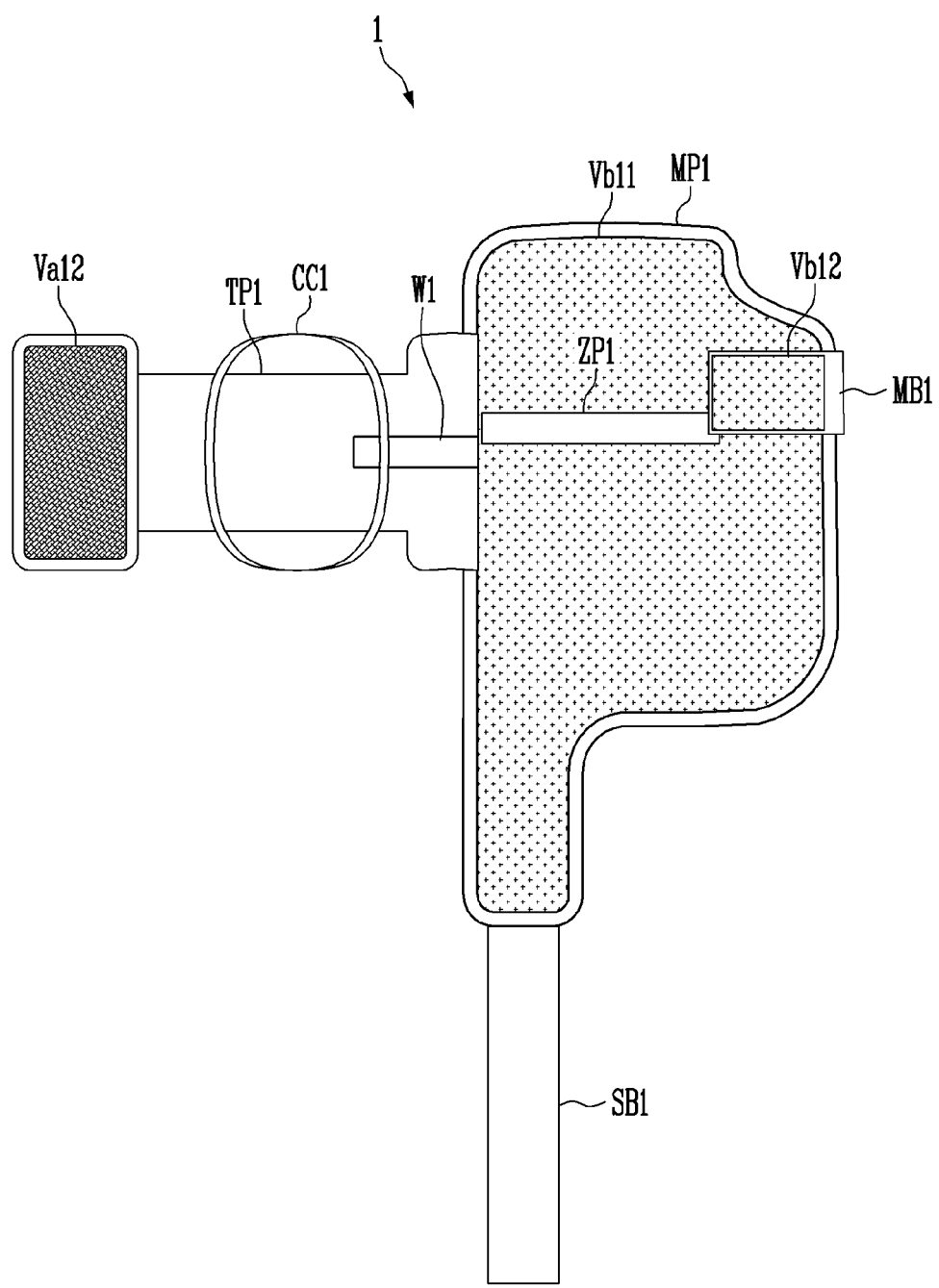
FIGS. 9 to 12 are views illustrating a wearing procedure of the tactile stimulation providing device according to the first embodiment of the present disclosure.

First, referring to FIG. 9, the user may attach the third A-type attachable/detachable member Va13 of the first main band MB1 to the first B-type attachable/detachable member Vb11 at the upper surface of the second layer member MP1. Accordingly, the first main band MB1 and the actuators ac1 can form a ring shape.

The second B-type attachable/detachable member Vb12 of the first main band Mb1 is exposed together with the first B-type attachable/detachable member Vb11 of the second layer member MP1 in the direction of the upper surface.

Figure 10:
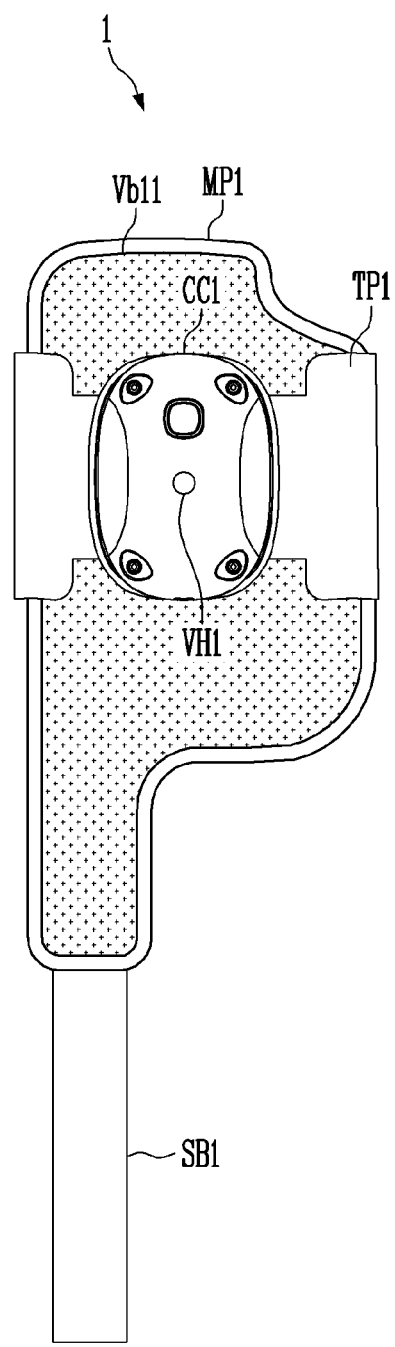

Referring to FIGS. 9 and 10, the user may properly attach the second A-type attachable/detachable member Va12 of the third layer member TP1 to the first B-type attachable/detachable member Vb11 or the second B-type attachable member Vb12. For example, the second A-type attachable/detachable member Va12 may be simultaneously attached to the first B-type attachable/detachable member Vb11 and the second B-type attachable/detachable member Vb12. Accordingly, the control case CC1 made of a firm material can be fixed to the wearing part regardless of the size of the first body part of the user.

Figure 11:
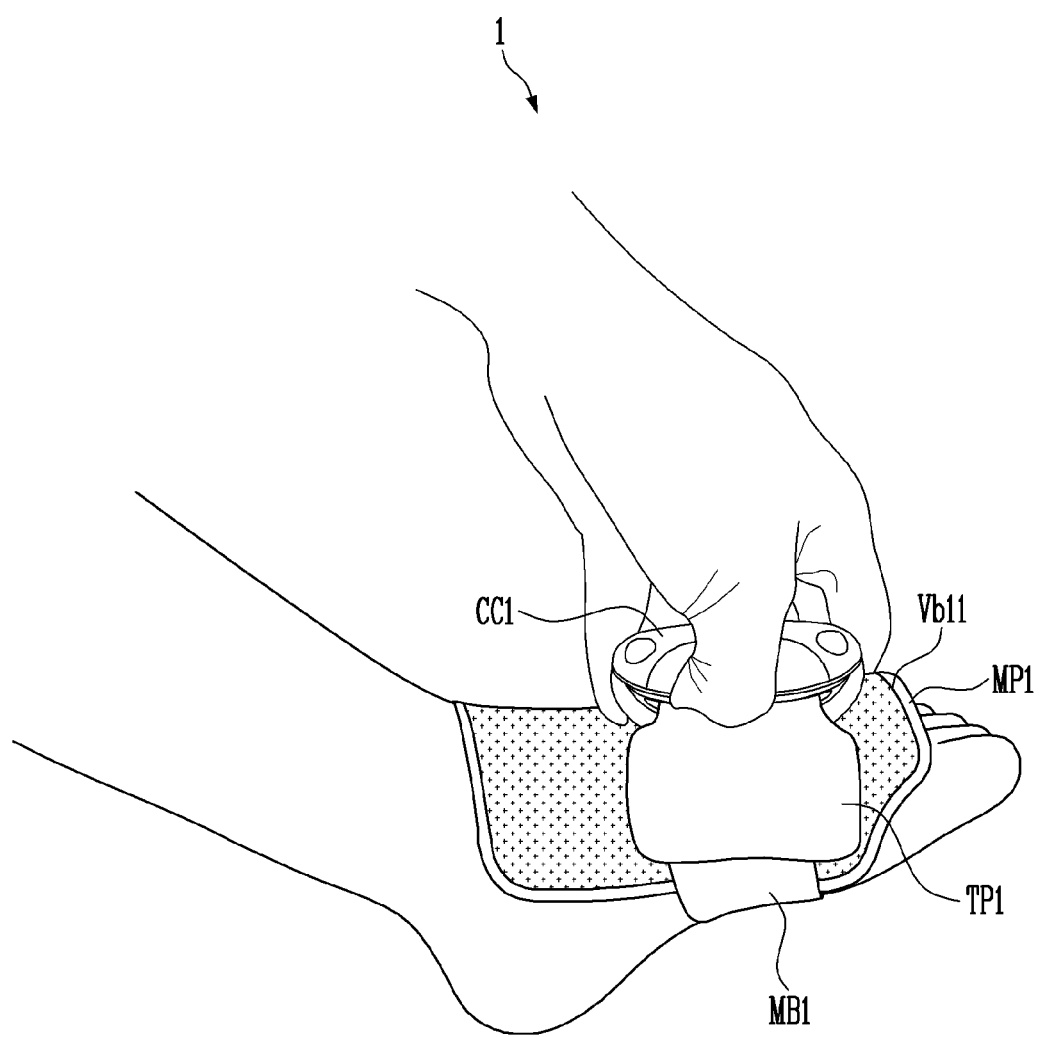

Referring to FIG. 11, a case where the ring-shaped wearing part created through the procedure of FIGS. 9 and 10 is fitted around the first body part (here, a top side of a foot) of the user is illustrated. The angle of the wearing part may be adjusted such that the lower surface of the first layer member BP1, at which the bottom cases bc1 are located, is adhered closely to the first body part of the user.

Figure 12:
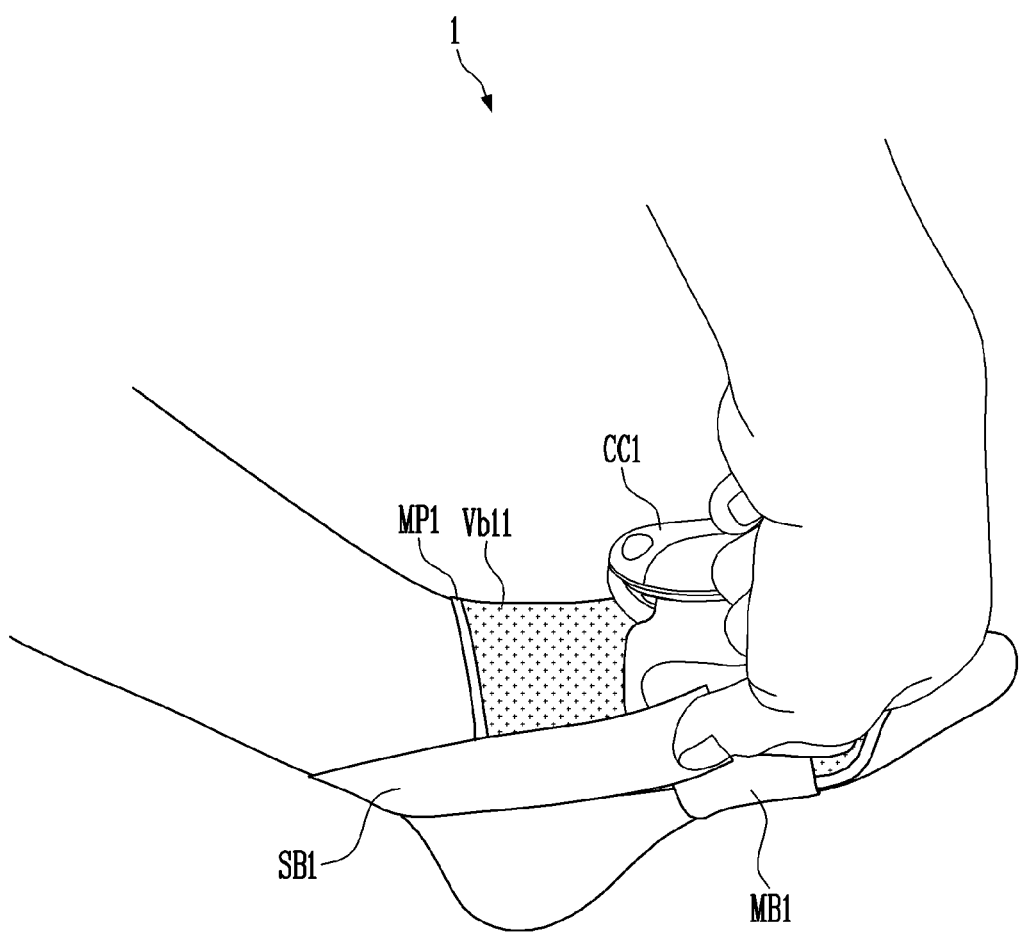

Next, referring to FIG. 12, the user may wind the sub-band SB1 around the second body part (here, an ankle) of the user such that the sub-band SB1 autonomously forms a ring shape, and attach the first A-type attachable/detachable member Va11 to the first B-type attachable/detachable member Vb11 in the vicinity of the third side SE13. Accordingly, the sub-band SB1 can be fixed to the second body part such that the ring-shaped wearing part surrounding the first body part is not rotated (slipped) in an undesired direction.

Figure 13:
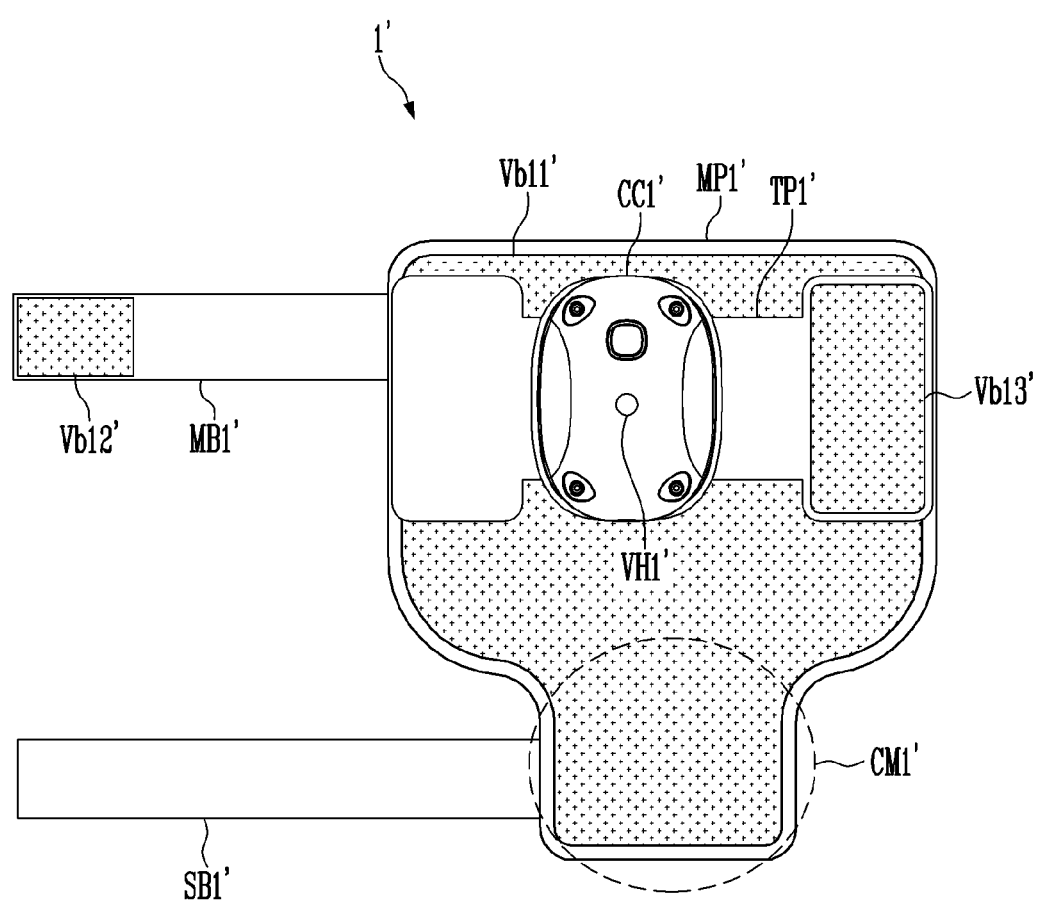
FIGS. 13 and 14 are views illustrating a modification of the tactile stimulation providing device according to the first embodiment of the present disclosure.
Figure 14:
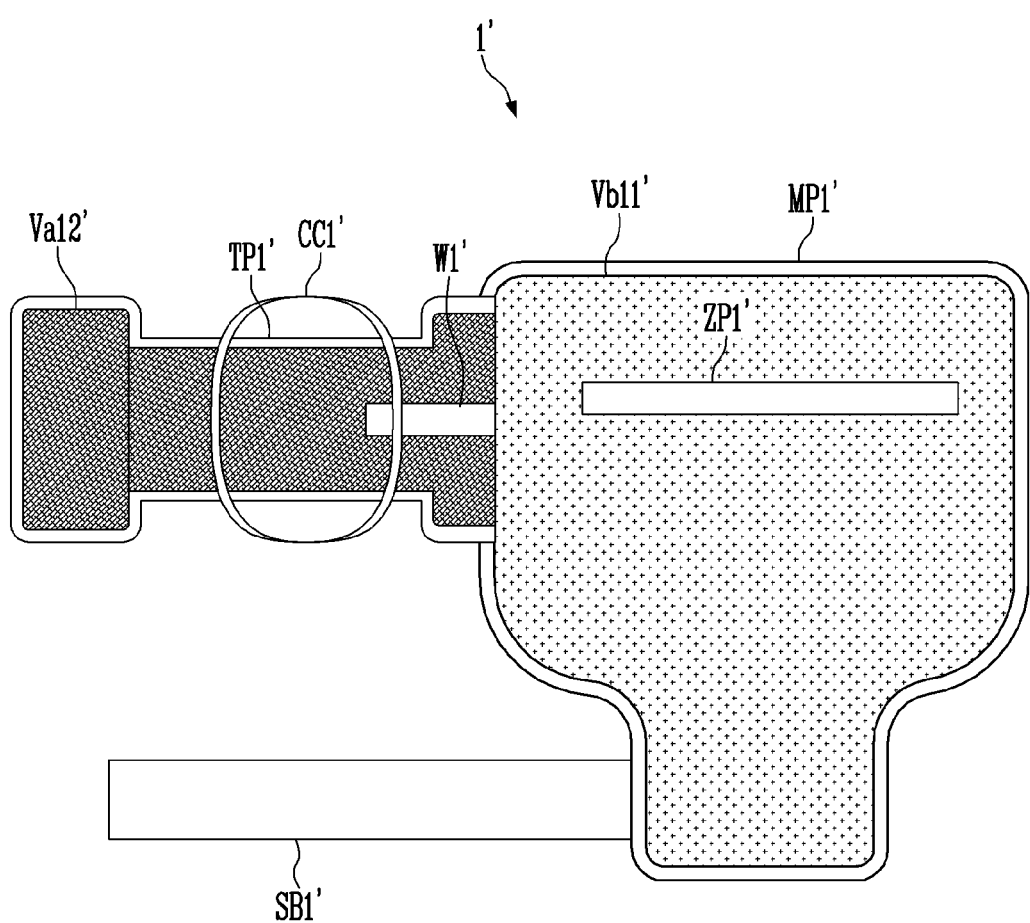

FIGS. 13 and 14 are views illustrating a modification of the tactile stimulation providing device according to the first embodiment of the present disclosure. In FIGS. 13 and 14, components similar to those of FIGS. 7 and 8 are designated by similar reference numerals. Hereinafter, for convenience of description, differences between the tactile stimulation providing device 1' and the tactile stimulation providing device 1 will be mainly described.

When comparing FIG. 13 with FIG. 7, the tactile stimulation providing device 1' further includes a third B-type attachable/detachable member Vb13'. The third B-type attachable/detachable member Vb13' may be located an upper surface in the vicinity of the other end of a third layer member TP1'.

Therefore, the user may have a wearing procedure of the tactile stimulation providing device 1, which is different from that of FIGS. 9 to 11. In FIGS. 9 to 11, the user first creates the first main band MB1, the wearing part, and the third layer member TP1 in a ring shape, and then fits the ring shape around the first body part, so that the tactile stimulation providing device 1 is worn on the first body part.

However, according to the structure of FIG. 13, the user attaches a second A-type attachable/detachable member Va12' to a first B-type attachable/detachable member Vb11, so that a controller case CC1' can be first fixed to a wearing part. When comparing FIG. 14 with FIG. 8, the shape and area of the second A-type attachable/detachable member Va12' are enlarged to correspond to those of the third layer member TP1'. According to this embodiment, Since the adhesion between the second A-type attachable/detachable member Va12' and the first B-type attachable/detachable member Vb11' increases, the second A-type attachable/detachable member Va12' can be prevented from being easily detached even when the weight of the controller case CC1' increases since a motion tracker is coupled to an upper portion of the controller case CC1'.

Next, the user attaches a third A-type attachable/detachable member to the third B-type attachable/detachable member Vb13' by winding a first main band MB1' around the first body part in a state in which the wearing part is supported by the first body part, so that the first main band MB1' and actuators can form a ring shape. According to this embodiment, the first main band MB1' and the actuators can be adhered closely to the first body part of the user to be suitable for the size of the first body part of the user.

Also, referring to FIGS. 13 and 14, a connecting part CM1' of a second layer member MP1' and the sub-band SB1' has been modified as compared with FIGS. 7 and 8. In FIGS. 7 and 8, a connecting part CM1 of the second layer member MP1 and the sub-band SB1 has been eccentric to be suitable for a desired body part between right and left feet of the user. However, in the embodiment of FIGS. 13 and 14, the connecting part CM1' of a second layer member MP1' and the sub-band SB1' has been located at the center of the wearing part such that there is no inconvenience even when the user wears the tactile stimulation providing device 1' on any body part between right and left feet of the user.

Also, in the embodiment of FIGS. 13 and 14, the extending direction of the sub-band SB1' may be parallel to the first main band MB1'. In addition, the connecting part CM1' may be formed long to sufficiently cover the joint between the first body part and the second body part (to ascend up to a lower side of a calf of the user). Accordingly, the angle or position of a ring shape autonomously formed by the sub-band SB1' does not give inconvenience to the user even when the user wears the tactile stimulation providing device 1' on any body part between right and left feet of the user.

Figure 15:
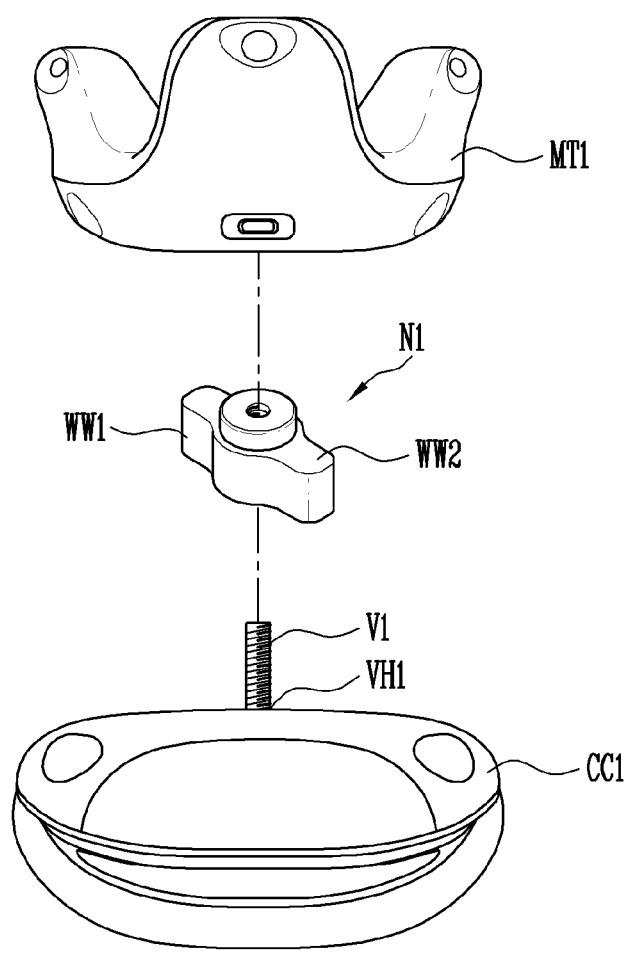
FIGS. 15 and 16 are views illustrating a structure in which a motion tracker is coupled to the controller case.
Figure 16:
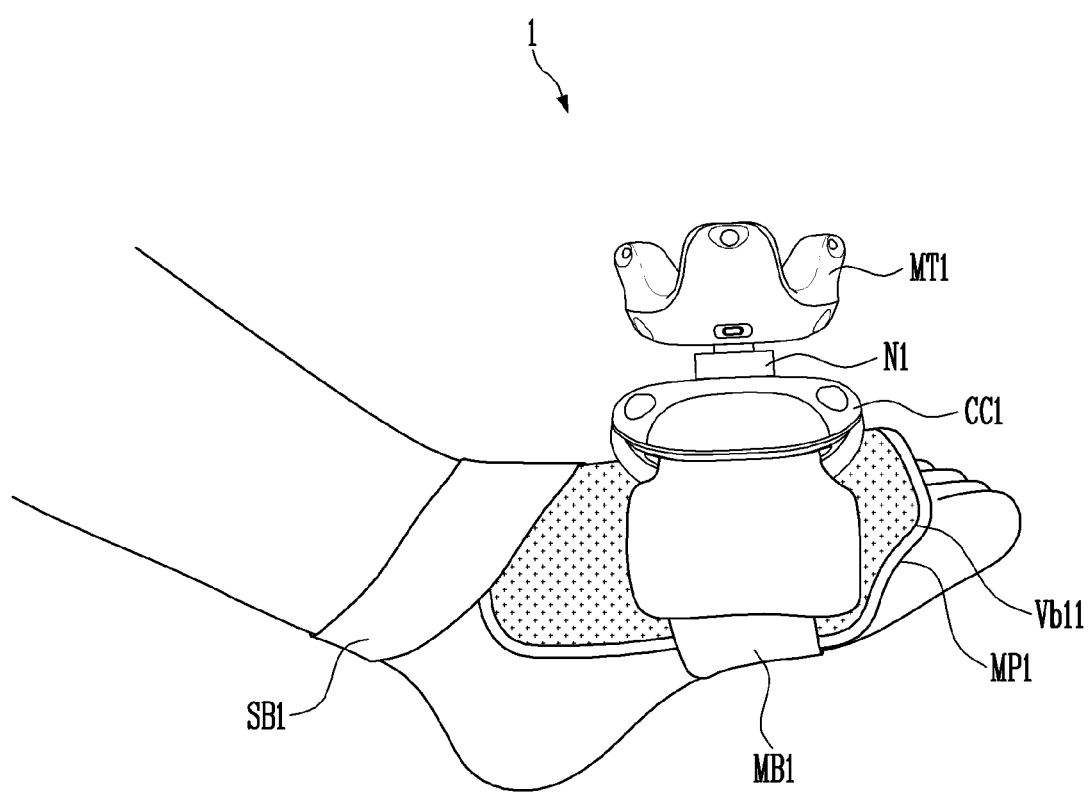

FIGS. 15 and 16 are views illustrating a structure in which a motion tracker is coupled to the controller case.

Referring to FIGS. 15 and 16, a bolt V1 protrudes in a vertical direction through the bolt insertion opening VH1 of the controller case CC1. An angle adjusting nut N1 and a motion tractor MT1 may be sequentially fitted around the bolt V1.

The motion tracker MT1 may be a device capable of checking a position of the motion tracker MT1 on a three-dimensional space by receiving an infrared signal radiated from an external base station. In another embodiment, the motion tracker MT1 may be designed in a form that has an acceleration sensor, a gyro sensor, etc., built therein to calculate an amount changed based on a specific absolute value set initially. The user moves the motion tracker MT1, so that its own motion can be used as an input means.

First, the user may locate the motion tracker MT1 at a desired height and angle by fitting the motion tracker MT1 around the bolt V1 and then rotating the motion tracker MT1 in the direction (lower direction) of the angle adjusting nut N1. Next, the user may fix the motion tracker MT1 to the bolt V1 by rotating the angle adjusting nut N1 in the direction (upper direction) of the motion tracker MT1. The user may rotate the angle adjusting nut N1 by grasping or pushing rotating supports WW1 and WW2 of the angle adjusting nut N1 with fingers.

Figure 17:
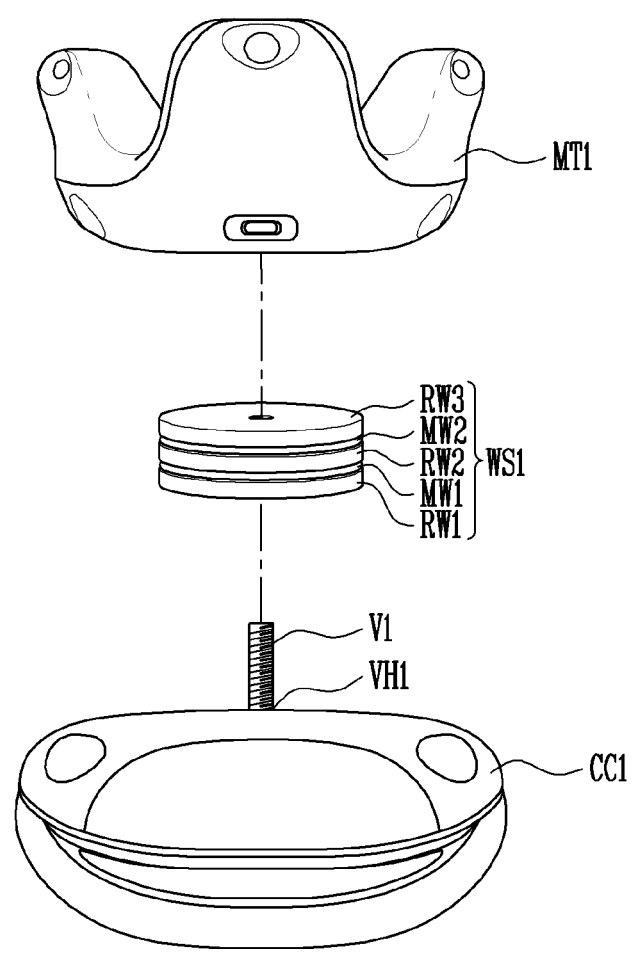
FIG. 17 is a view illustrating a structure in which the motion tracker is differently coupled to the controller case.

FIG. 17 is a view illustrating a structure in which the motion tracker is differently coupled to the controller case.

Referring to FIG. 17, when the motion tracker MT1 is coupled to the tactile stimulation providing device 1, a washer assembly WS1 is used instead of the angle adjusting nut N1.

The washer assembly WS1 may include rubber washers RW1, RW2, and RW3 and at least one metal washer MW1 and MW2 located between the rubber washers RW1, RW2, and RW3. In the embodiment of FIG. 17, a rubber washer RW1, a metal washer MW1, a rubber washer RW2, a metal washer MW2, and a rubber washer RW3 are sequentially stacked to constitute the washer assembly WS1. However, those skilled in the art may change the number of components. The rubber washers RW1, RW2, and RW3 may provide an elastic force and a supporting force, and the metal washers MW1 and MW2 may prevent occurrence of an excessive frictional force between the rubber washers RW1, RW2, and RW3.

The user may fit the motion tracker MT1 around the bolt V1 and then rotate the motion tracker MT1 in the direction (lower direction) of the washer assembly WS1. Although the motion tracker MT1 is in contact with the washer assembly WS1, the user may further rotates the motion tracker MT1, due to the elastic force of the rubber washers RW1, RW2, and RW3, until the motion tracker MT1 is located at a desired angle. When comparing FIG. 17 with FIGS. 15 and 16, the user simply rotates the motion tracker MT1 without inconvenience that adjusting the angle by grasping or pushing the angle adjusting nut N1 with the fingers, so that the motion tracker MT1 can be firmly fixed to the controller case CC1 at a desired angle.

Although the washer assembly WS1 is provided in the embodiment of FIG. 17, a single rubber washer optimized through elastic amount and thickness adjustment may be provided. Therefore, the metal washers are not required.

Figure 18:
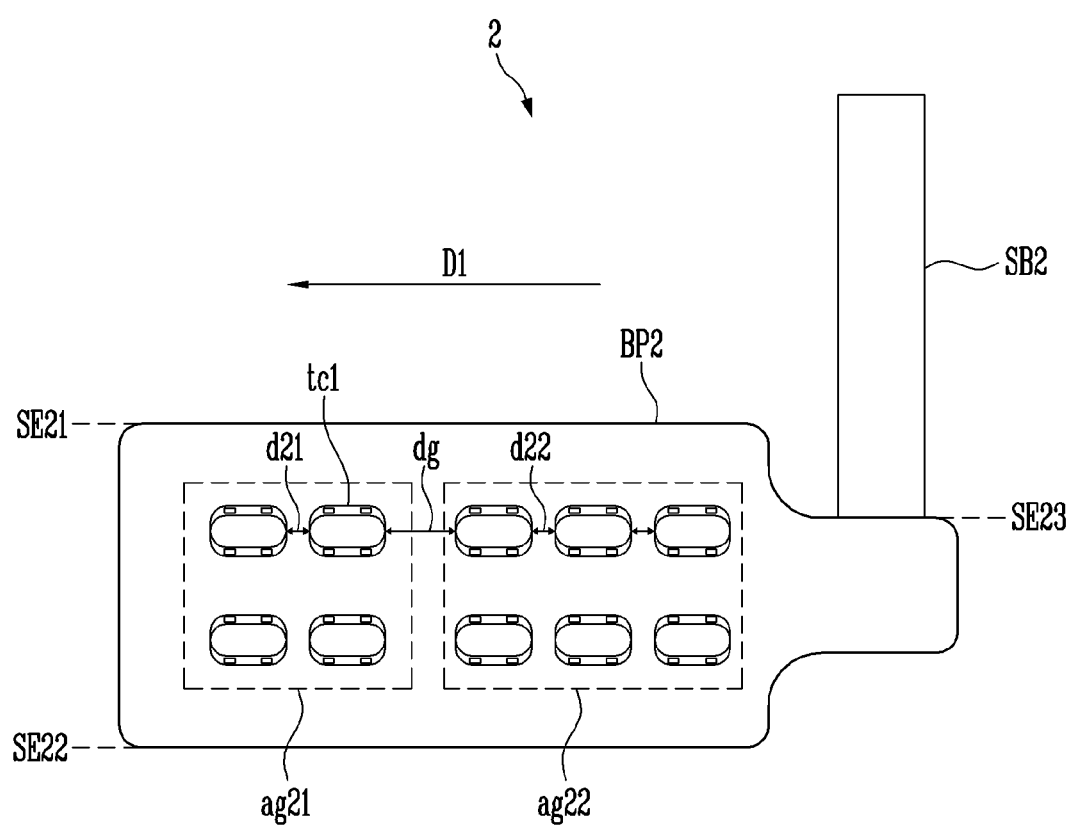
FIG. 18 is a view illustrating an upper surface of a first layer member of a tactile stimulation providing device according to a second embodiment of the present disclosure.
Figure 19:
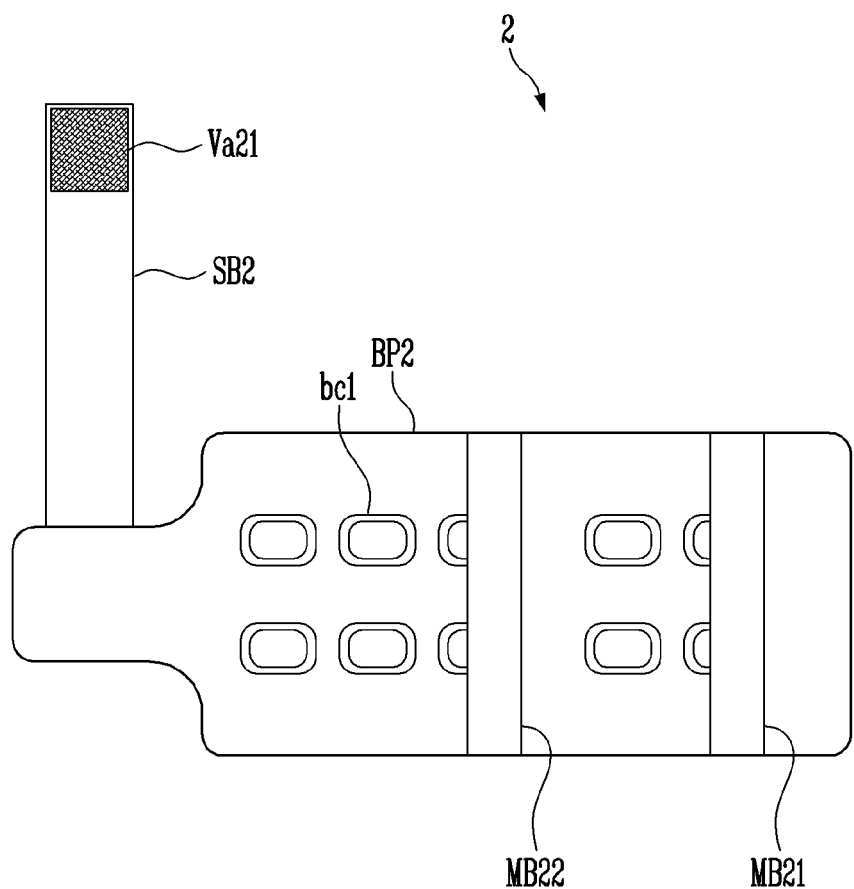
FIG. 19 is a view illustrating a lower surface of the first layer member of the tactile stimulation providing device according to the second embodiment of the present disclosure.

FIG. 18 is a view illustrating an upper surface of a first layer member of a tactile stimulation providing device according to a second embodiment of the present disclosure. FIG. 19 is a view illustrating a lower surface of the first layer member of the tactile stimulation providing device according to the second embodiment of the present disclosure.

Referring to FIGS. 18 and 19, the tactile stimulation providing device 2 according to the second embodiment of the present disclosure includes a first layer member BP2, a first main band MB21, a second main band MB22, and a sub-band SB2.

A wearing part of the second embodiment may also be configured in a triple layer structure, and the first layer member BP2 in the triple layer structure will be first described in FIG. 18.

The first layer member BP2 may be made of a flexible material such as cloth, rubber or plastic. The shape and size of the first layer member BP2 may be determined suitable for a first body part of a user. In the second embodiment, the first body part may be a top side of a hand of a user and a finger of the user.

Actuators ac1 may be disposed between a first side SE21 and a second side SE22 of the first layer member BP2, i.e., the wearing part. Since the actuators ac1 are covered by top cases tc1, the actuators ac1 are not shown in FIG. 18. The top cases tc1 are adhered closely to the upper surface of the first layer member BP2, and are coupled to corresponding bottom cases bc1 to fix corresponding actuators ac1.

In this embodiment, the actuators ac1 may be grouped into at least two groups. Actuators of a first group ag21 may be spaced apart from each other at a first distance d21 in a first direction D1, and actuators of a second group ag22 may be spaced apart from each other at a second distance d22 in the first direction D1. The first distance d21 and the second distance d22 may be equal to or different from each other. However, in the first direction D1, a minimum distance dg between the actuator of the first group ag21 and the actuator of the second group ag22 may be set longer than the first distance d21 and the second distance d22.

In this embodiment, the first body part of the user may be a top side of a hand of the user and a finger of the user as described above. The actuators of the first group ag21 may be disposed to correspond to the finger, and the actuators of the second group ag22 may be disposed to correspond to the top side of the hand. Since a joint exists between the finger and the top side of the hand, it is necessary that the first group ag21 and the second group ag22 should be spaced apart from each other at the minimum distance dg or more.

The first and second main bands MB21 and MB22 may be made of an elastic material such as cloth, rubber or plastic. One ends of the first and second main bands MB21 and MB22 are located in the vicinity of the first side SE21 of the wearing part, and the other ends of the first and second main bands MB21 and MB22 are fastenable to the vicinity of the second side SE22 of the wearing part. In drawings from FIG. 16, a state in which the other ends of the first and second main bands MB21 and MB22 are continuously being fastened to the vicinity of the second side SE22 of the wearing part is assumed.

The first main band MB21 may have the one end located in the first side SE21 of the wearing part and the other end located in the vicinity of the second side SE22 of the wearing part to overlap with at least some of the actuators of the first group ag21, and the second main band MB22 may have the one end located in the first side SE21 of the wearing part and the other end located in the vicinity of the second side SE22 of the wearing part to overlap with at least some of the actuators of the second group ag22. Thus, the first main band MB21 forms a ring shape with the actuators of the first group ag21, to allow the actuators of the first group ag21 to be adhered closely to the finger of the user. In addition, the second main band MB22 forms a ring shape with the actuators of the second group ag22, to allow the actuators of the second group ag22 to be adhered closely to the top side of the hand of the user.

The sub-band SB2 may be made of an elastic material such as cloth, rubber or plastic. One end of the sub-band SB2 is connected to the vicinity of a third side SE23 of the wearing part, and the other end of the sub-band SB2 is fastenable to the vicinity of the third side SE23. The fastening of the other end of the sub-band SB2 will be described later with reference to FIG. 21. When the sub-band SB2 is fastened, the sub-band SB2 may autonomously form a ring shape to be adhered closely to a second body part of the user. The first body part and the second body part may be adjacent body parts connected to each other through a joint. As described above, when the first body part corresponds to the top side of the hand of the user and the finger of the user, the second body part may correspond to a wrist of the user. According to an embodiment of the present disclosure, the sub-band SB2 may be fixed at the second body part such that the ring-shaped wearing part surrounding the first body part is not rotated (slipped) in an undesired direction.

A first A-type attachable/detachable member Va21 may be located at a lower surface in the vicinity of the other end of the sub-band SB2.

Figure 20:
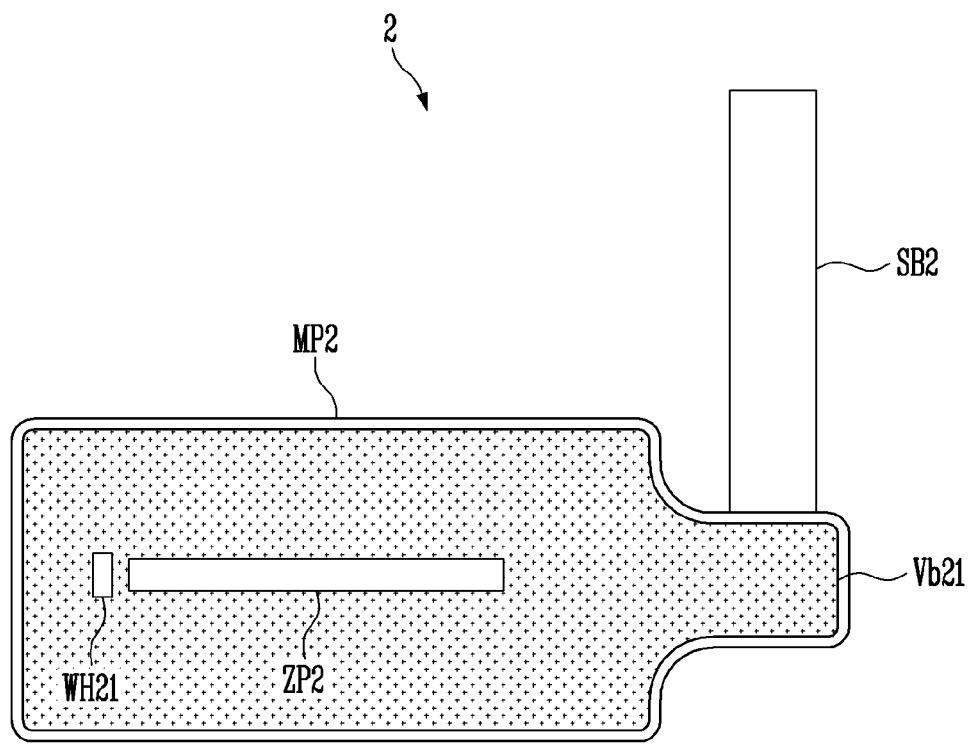
FIG. 20 is a view illustrating an upper surface of a second layer member of the tactile stimulation providing device according to the second embodiment of the present disclosure.

FIG. 20 is a view illustrating an upper surface of a second layer member of the tactile stimulation providing device according to the second embodiment of the present disclosure.

Referring to FIG. 20, the second layer member MP2 is illustrated, which has at least a portion of an edge, which is coupled to the first layer member BP2 on the first layer member BP2. Since the first layer member BP2 is covered by the second layer member MP2, the first layer member BP2 is not shown in FIG. 20.

The second layer member MP2 may be made of a flexible material such as cloth, rubber or plastic. The shape and size of the second layer member MP2 may correspond to those of the first layer member BP2.

The second layer member MP2 functions to cover the top cases tc1 and wirings extending therefrom from eyes of the user. The second layer member MP2 includes a first wiring opening WH21, and the wirings can be gathered and neatly extracted through the first wiring opening WH21. The second layer member MP2 may selectively further include a zipper member ZP2 as a path for organizing the actuators act and the wirings.

A first B-type attachable/detachable member Vb21 may be disposed at the upper surface of the second layer member MP2. The size and shape of the first B-type attachable/detachable member Vb21 may correspond to those of the second layer member MP2.

Figure 21:
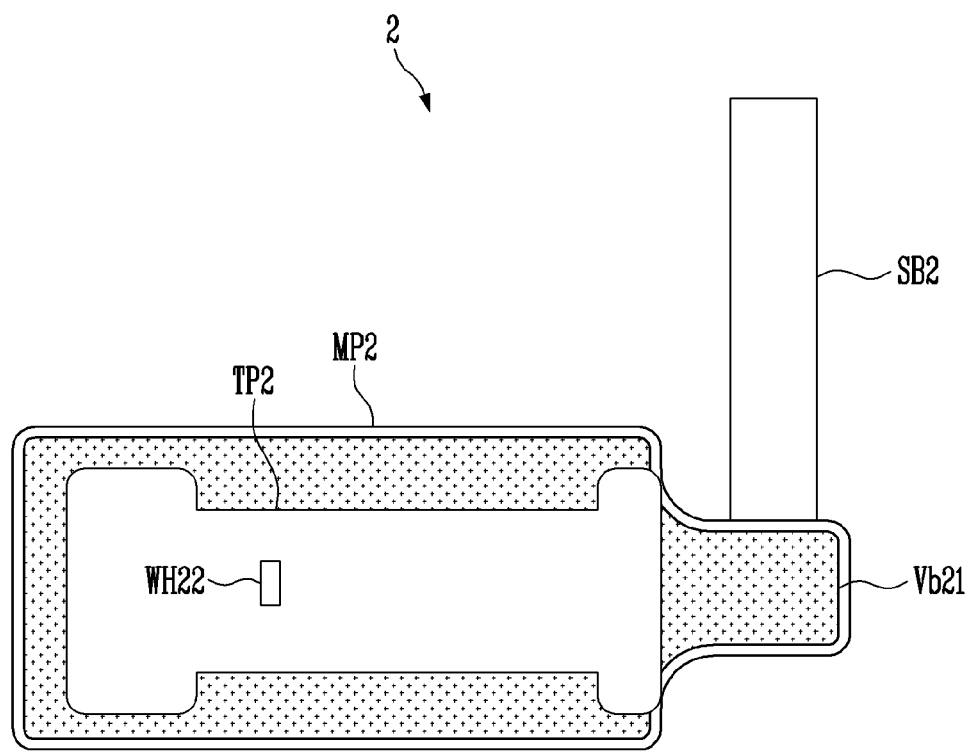
FIGS. 21 and 22 are views respectively illustrating upper and lower surfaces of a third layer member of the tactile stimulation providing device according to the second embodiment of the present disclosure.
Figure 22:
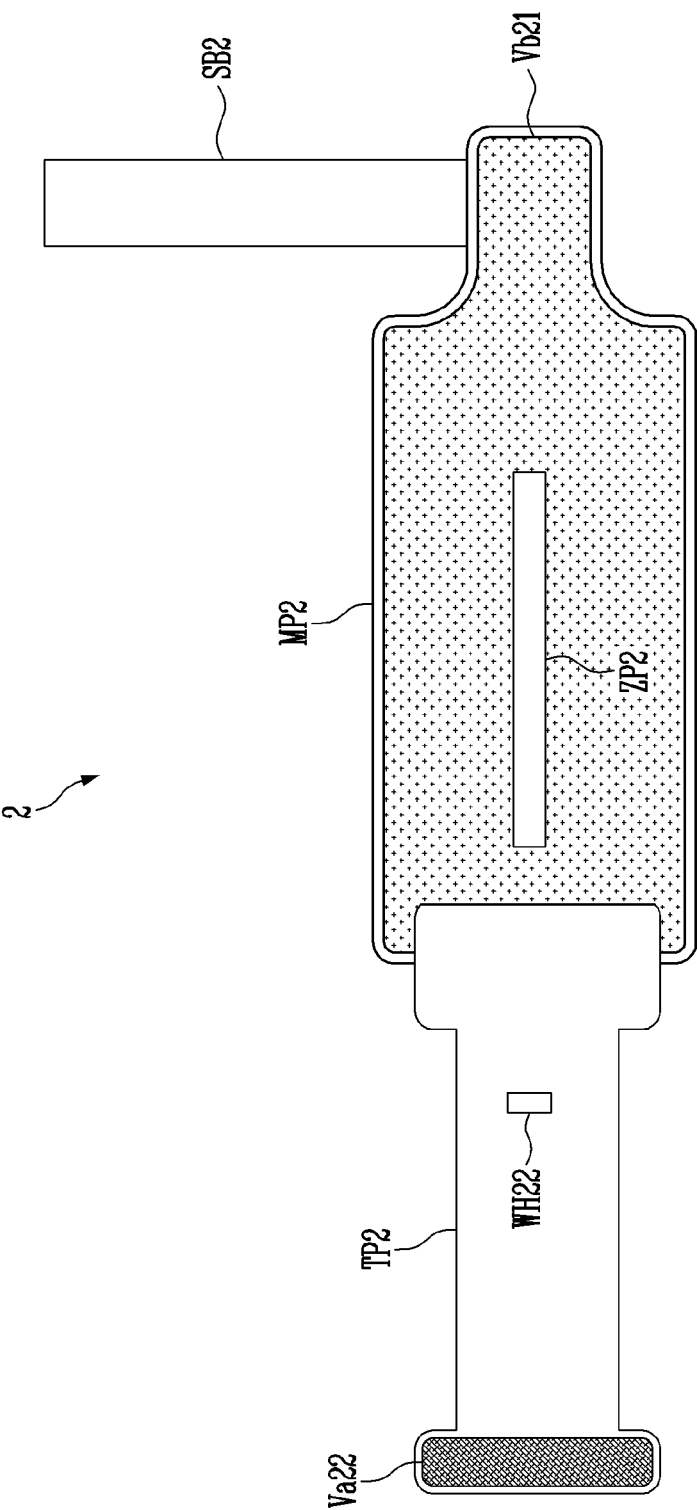

FIGS. 21 and 22 are views respectively illustrating upper and lower surfaces of a third layer member of the tactile stimulation providing device according to the second embodiment of the present disclosure.

Referring to FIG. 21, the third layer member TP2 is illustrated, which has one end connected to the second layer member MP2 on the second layer member MP2.

The third layer member TP2 may be made of a flexible material such as cloth, rubber or plastic. Unlike the second layer member MP2, the shape and size of the third layer member TP2 may not correspond to those of the first layer member BP2.

The third layer member TP2 may include a second wiring opening WH22. The third layer member TP2 may be configured to again extract the wirings extracted from the first wiring opening WH21 through the second wiring opening WH22 while covering the wirings from the eyes of the user.

Referring to FIG. 22, a second A-type attachable/detachable member Va22 may be disposed at a lower surface in the vicinity of the other end of the third layer member TP2.

Figure 23:
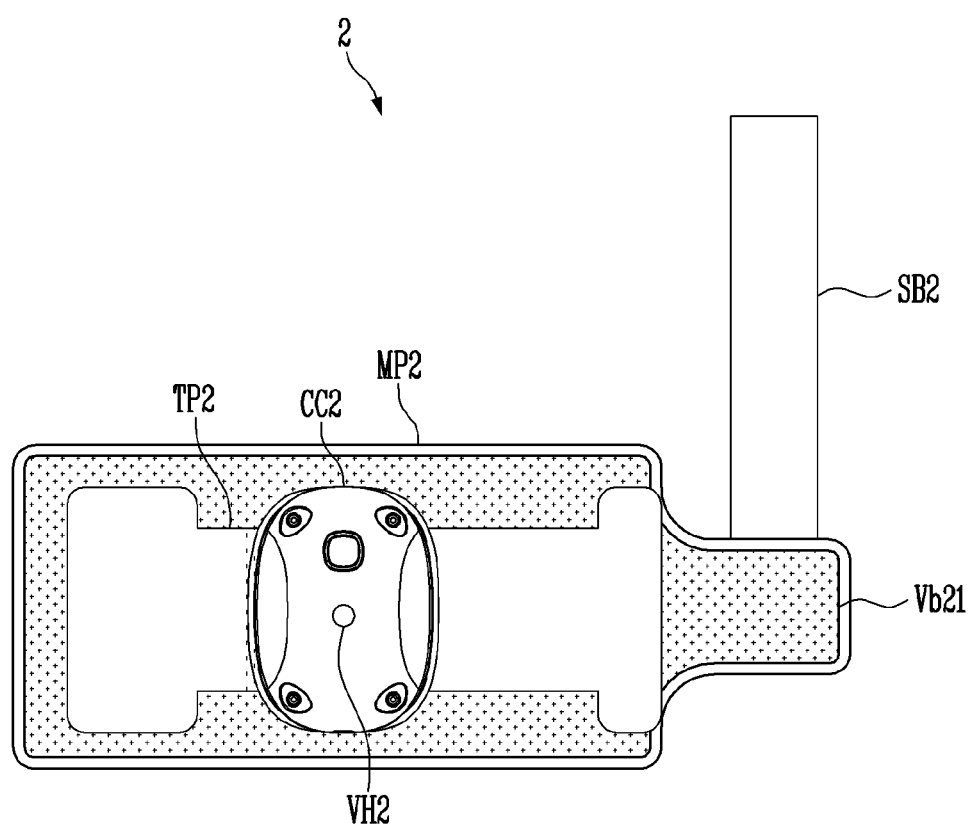
FIG. 23 is a view illustrating a controller case of the tactile stimulation providing device according to the second embodiment of the present disclosure.

FIG. 23 is a view illustrating a controller case of the tactile stimulation providing device according to the second embodiment of the present disclosure.

Referring to FIG. 23, the controller case CC2 fitted into the third layer member TP2 is illustrated. The width of the third layer member TP2 is configured narrower than that of a lower end opening of the controller case CC2, so that the controller case CC2 can be fitted into the third layer member TP2 in the length direction.

In some embodiments, the controller case CC1 may further include a bolt insertion opening VH2 at an upper end thereof.

Similarly to the first embodiment, the controller case CC2 may further include a third wiring opening at a lower surface thereof. Thus, the actuators ac1 and a controller in the controller case CC2 can be electrically connected by a wiring through the first wiring opening WH21, the second wiring opening WH22, and the third wiring opening.

Figure 24:
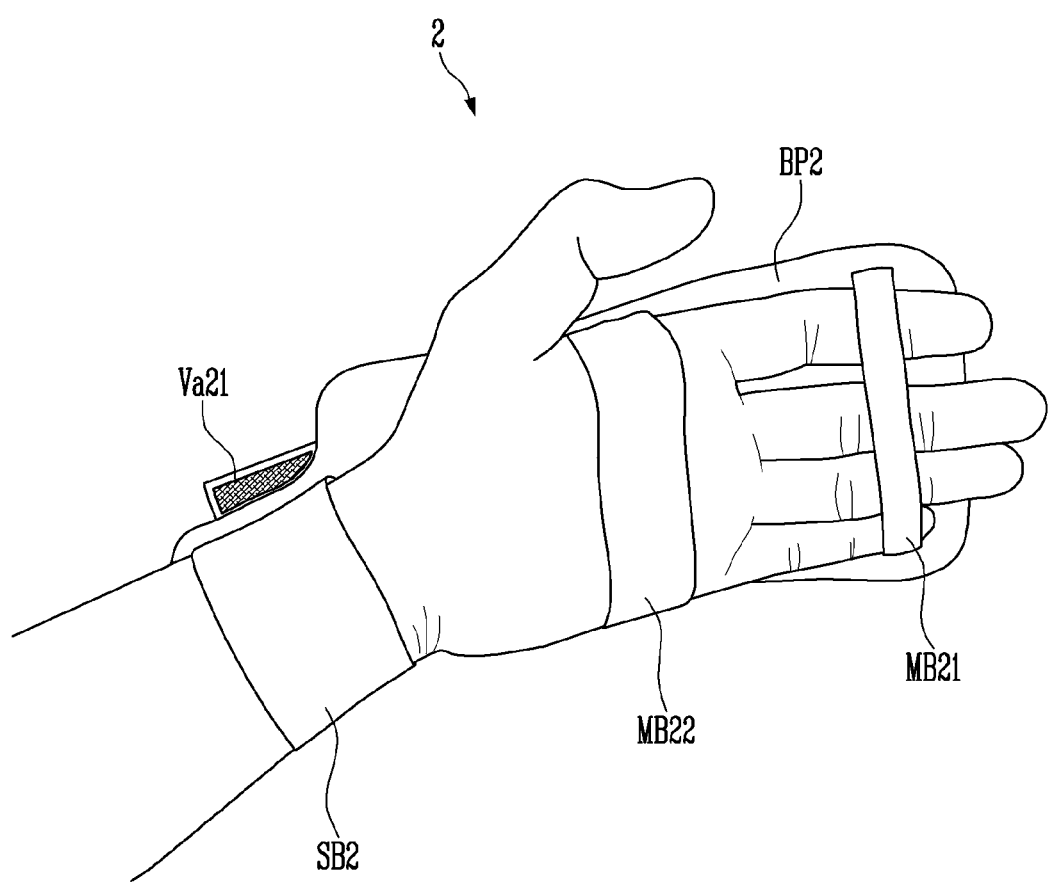
FIG. 24 is a view illustrating a wearing procedure of the tactile stimulation providing device according to the second embodiment of the present disclosure.

FIG. 24 is a view illustrating a wearing procedure of the tactile stimulation providing device according to the second embodiment of the present disclosure.

First, the user fits the finger that is a portion of the first body part into the first main band MB21, and fits the top side of the hand, which is the other of the first body part, into the second main band MB22.

Next, the user winds the sub-band SB2 around the write that is the second body part such that the sub-band SB1 autonomously forms a ring shape, so that the first A-type attachable/detachable member Va21 is attached to the first B-type attachable/detachable member Vb21.

Although not shown in the drawing, like the first embodiment, the second A-type attachable/detachable member Va22 is properly attached to the first B-type attachable/detachable member Vb21, so that the controller case CC2 can be fixed to the wearing part regardless of the size of the first body part of the user.

Figure 25:
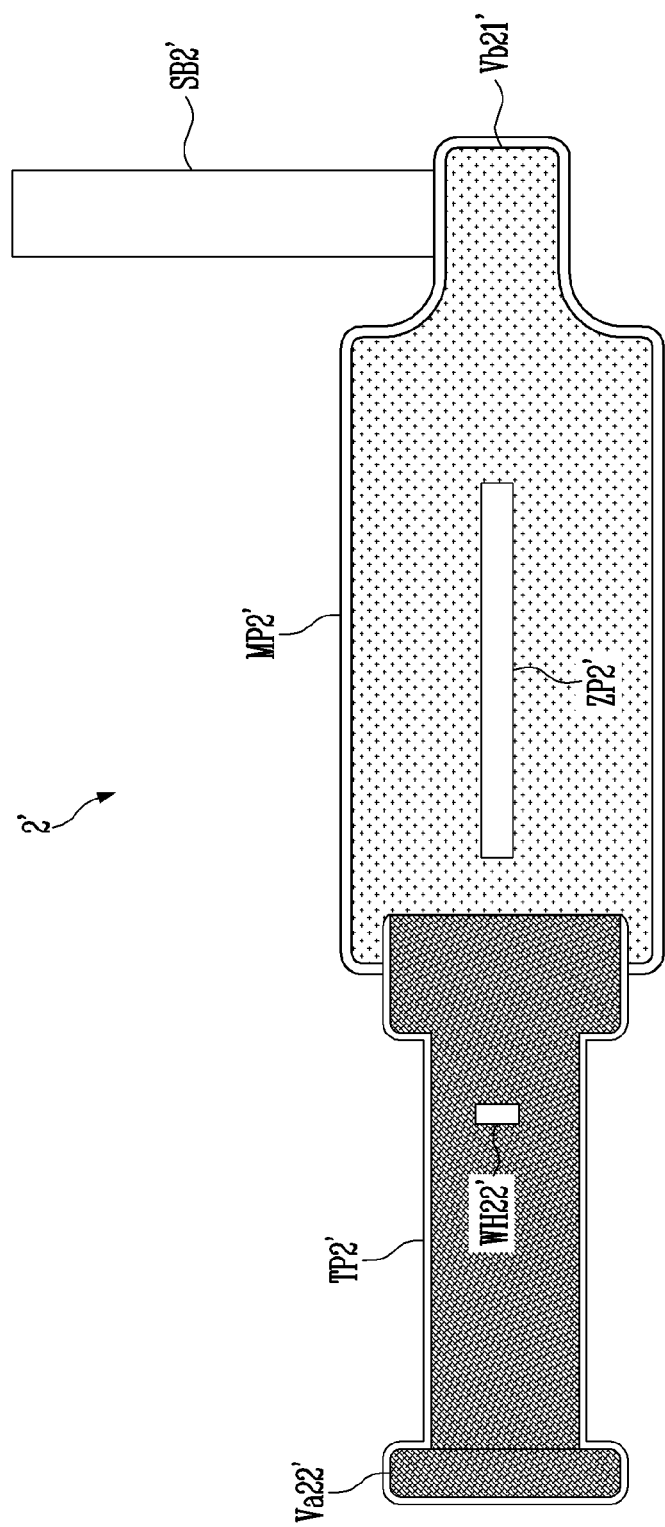
FIG. 25 is a view illustrating a modification of the tactile stimulation providing device according to the second embodiment of the present disclosure.

FIG. 25 is a view illustrating a modification of the tactile stimulation providing device according to the second embodiment of the present disclosure. In FIG. 25, components similar to those of FIG. 22 are designated by similar reference numerals. Hereinafter, for convenience of description, differences between the tactile stimulation providing device 2' and the tactile stimulation providing device 2 will be mainly described.

The tactile stimulation providing device 2' of FIG. 25 includes a second A-type attachable/detachable member Va22' expanded as compared with the tactile stimulation providing device 2 of FIG. 22.

The shape and area of the second A-type attachable/detachable member Va22' may be expanded to correspond to those of a third layer member TP2'. According to this embodiment, since the adhesion between the second A-type attachable/detachable member Va22' and a first B-type attachable/detachable member Vb21' increases, the second A-type attachable/detachable member Va22' can be prevented from being easily detached even when the weight of a controller case increases since a motion tracker is coupled to an upper portion of the controller case.

Figure 26:
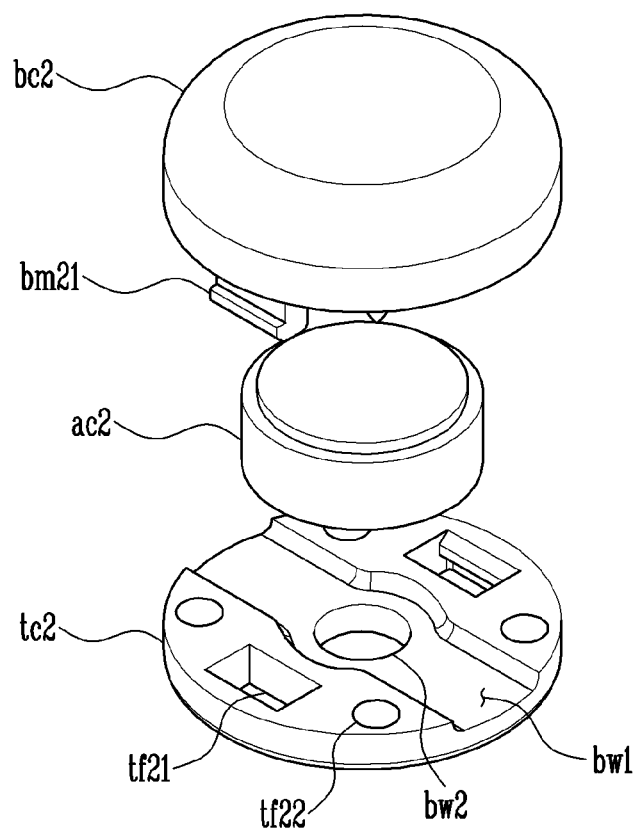
FIGS. 26 and 27 are views illustrating an actuator assembly at different visual points according to another embodiment of the present disclosure.
Figure 27:
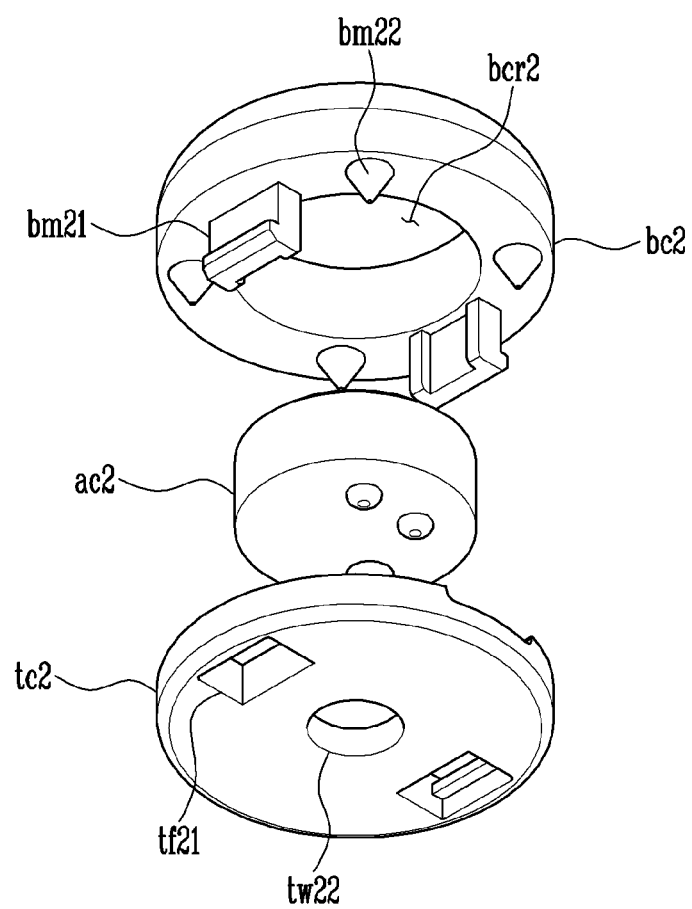

FIGS. 26 and 27 are views illustrating an actuator assembly at different visual points according to another embodiment of the present disclosure.

Referring to FIGS. 26 and 27, the actuator assembly AA2 is configured to include an actuator ac2, a top case tc2, and a bottom case bc2. The actuator ac2 may be a coin motor.

The bottom case bc2 may include an actuator accommodating part bcr2 for accommodating the actuator ac2. Thus, the actuator ac2 is disposed more closely to the bottom case bc2, so that vibration of the actuator ac2 can be better transferred to the user.

The bottom case bc2 may include a male fastening part bm21 and a projection bm22, and the top case tc2 may include a female fastening part tf21 and a recess part tf22. The first layer member BP1 or BP2 may include an opening corresponding to the male fastening part bm21. The male fastening part bm21 may be coupled to the female fastening part tf21 through the opening of the first layer member BP1 or BP2. The projection bm22 is fitted into the recess part tf22 by pressurizing the first layer member BP1 or BP2, so that the top case tc2 and the bottom case bc2 can be more stably fixed to the first layer member BP1 or BP2.

The top case tc2 may include wiring paths tw21 and tw22. A wiring may electrically connect the actuator ac2 and the controller through the wiring paths tw21 and tw22.

Figure 28:
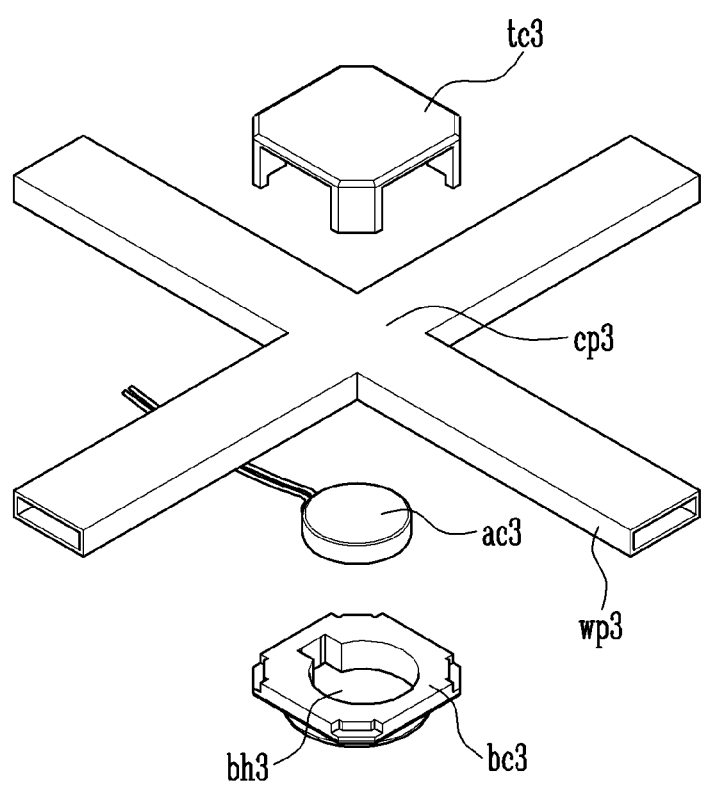
FIG. 28 is a view illustrating an actuator assembly at different visual points according to still another embodiment of the present disclosure.

FIG. 28 is a view illustrating an actuator assembly at different visual points according to still another embodiment of the present disclosure.

Referring to FIG. 28, the actuator assembly AA3 includes an actuator ac3, a bottom case bc3, a top case tc3, and a tubular wiring path wp3.

The actuator ac3 may be accommodated in an accommodating part bh3 of the bottom case bc3, and be supported at an intersection part cp3 of the tubular wiring path wp3.

The top case tc3 may be coupled to the bottom case bc3 while covering the intersection part cp3 of the tubular wiring path wp3.

When the actuator assembly AA3 having the structure shown in FIG. 28 is employed, the top and bottom cases tc3 and bc3 can be located between the first layer member BP1 or BP2 and the second layer member MP1 or MP2. Thus, the top and bottom cases tc3 and bc3 is not viewed by the user. Actuators ac3 may be supported at intersection parts cp3 of tubular wiring paths wp3, respectively.

Figure 29:
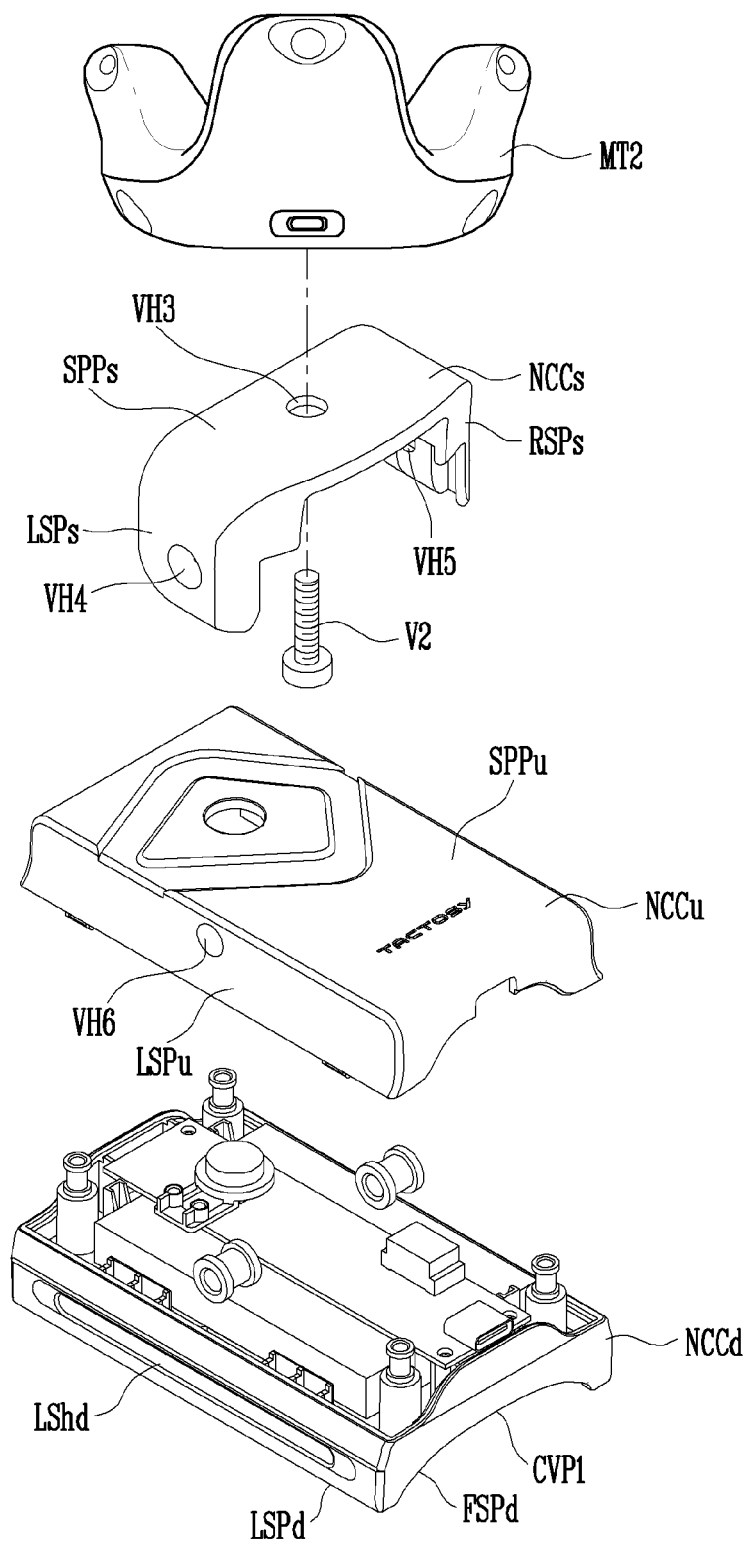
FIGS. 29 and 30 is a view a structure in which a motion tracker is coupled to the controller case according to another embodiment of the present disclosure.
Figure 30:
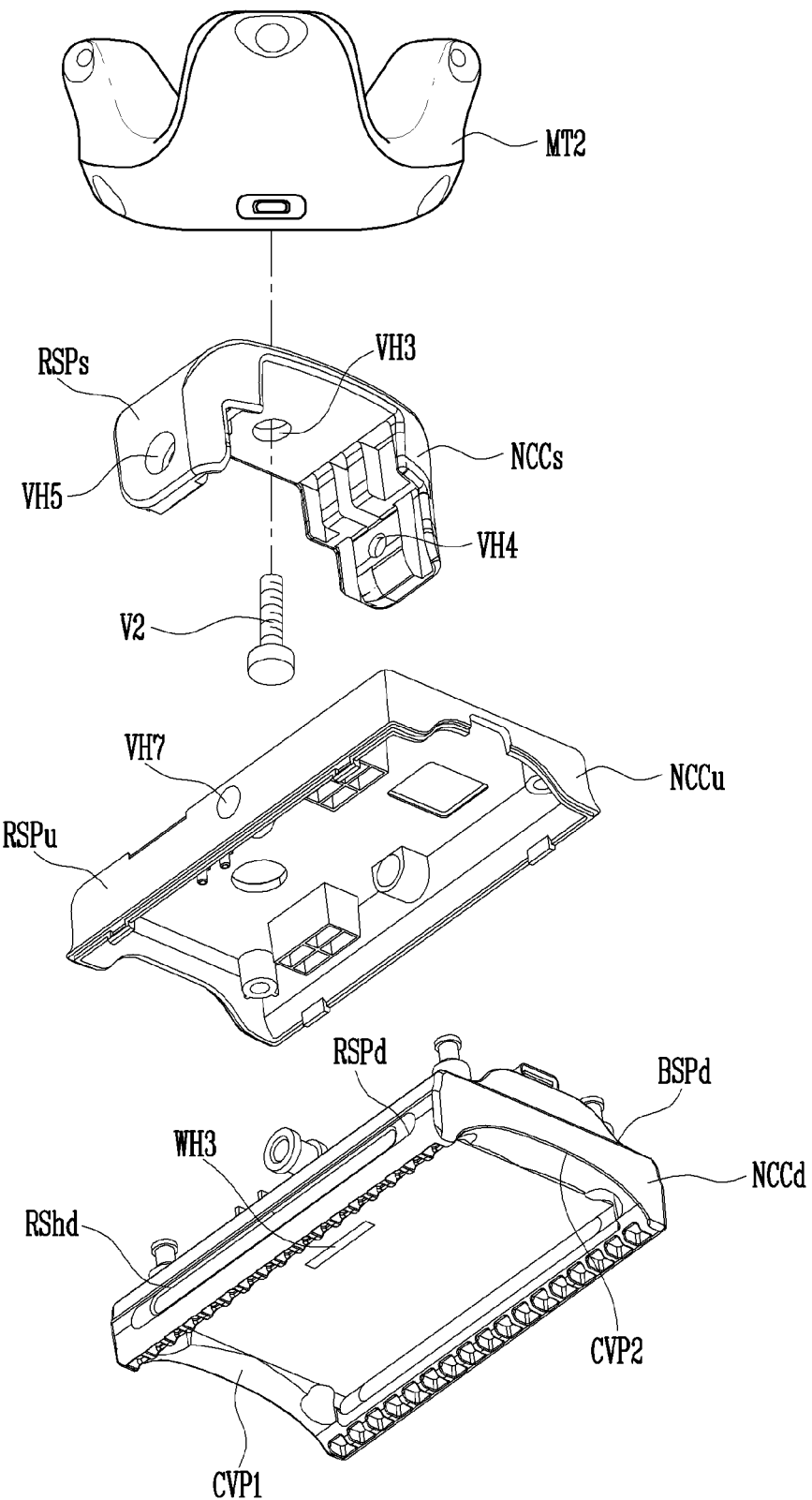

FIGS. 29 and 30 is a view a structure in which a motion tracker is coupled to the controller case according to another embodiment of the present disclosure.

The motion tracker MT2 may have a configuration identical or similar to that of the above-described motion tracker MT1, and therefore, overlapping descriptions will be omitted.

The controller case may include an upper case NCCu and a lower case NCCd. A controller may be included in the controller case. For example, the controller may be accommodated between the upper case NCCu and the lower case NCCd.

The lower case NCCd may include a third wiring opening WH3. A plurality of actuators and the controller may be electrically connected through the third wiring opening WH3.

The lower case NCCd may include a front side part FSPd, a back side part BSPd, a left side part LSPd, and a right side part RSPd. For example, the front side part FSPd may include a concave part CVP1, and the back side part BSPd may include a concave part CVP2. The shapes of the concave parts CVP1 and CVP2 may be determined to correspond to the winding of a body part of a user, which is to be worn. For example, the left side part LSPd may include an opening LShd, and the right side part RSPd may include an opening RShd. A third layer member may be fitted into the openings LShd and RShd.

The upper case NCCu may include bolt insertion openings VH6 and VH7 respectively at side parts LSPu and RSPu. In some embodiments, the bolt insertion openings VH6 and VH7 may be located at the side parts FSPd, BSPd, LSPd, and RSPd of the lower case NCCd.

A portion of a tracker supporting member NCCs is fastenable to the controller case. Also, another portion of the tracker supporting member NCCs is fastenable to the motion tracker MT2.

For example, the tracker supporting member NCCs may include an upper plate SPPs and two side parts LSPs and RSPs extending at both sides of the upper plate SPPs. For example, the tracker supporting member NCCs may have a '[' left bracket shape.

The upper plate SPPs of the tracker supporting member NCCs may include a bolt insertion opening VH3. The motion tracker MT2 and the tracker supporting member NCCs may be coupled to each other, using the bolt insertion opening VH3 and a bolt V2. An angle adjusting member may be used at an upper surface, a lower surface, or the upper and lower surfaces of the upper plate SPPs. That is, the washer assembly WS1, the rubber washers RW1 to RW3, and the metal washers MW1 and MW2 of FIG. 17 may be used, and the angle adjusting nut N1 of FIG. 15 may be used. The angle adjusting member may be fitted around the bolt V2.

The side parts LSPs and RSPs of the tracker supporting member NCCs may include bolt insertion openings VH4 and VH5, respectively. The bolt insertion openings VH4 and VH5 may be located to correspond to the bolt insertion openings VH6 and VH7 when the tracker supporting member NCCs is fitted into the upper case NCCu. Thus, the user enables the tracker supporting member NCCs to be fixed to the upper case NCCu, further using two bolts.

Accordingly, when the user uses a tactile stimulation providing device in a state in which the motion tracker MT2 is removed, it is unnecessary to separate the controller case from the tactile stimulation providing device, and thus convenience increases.

In this embodiment, a case where the tracker supporting member NCCs and the upper case NCCs are fastened using the bolt is illustrated as an example. However, in another embodiment, the tracker supporting member NCCs and the upper case NCCs are fastened using another fastening member such as a plastic buckle.

Figure 31:
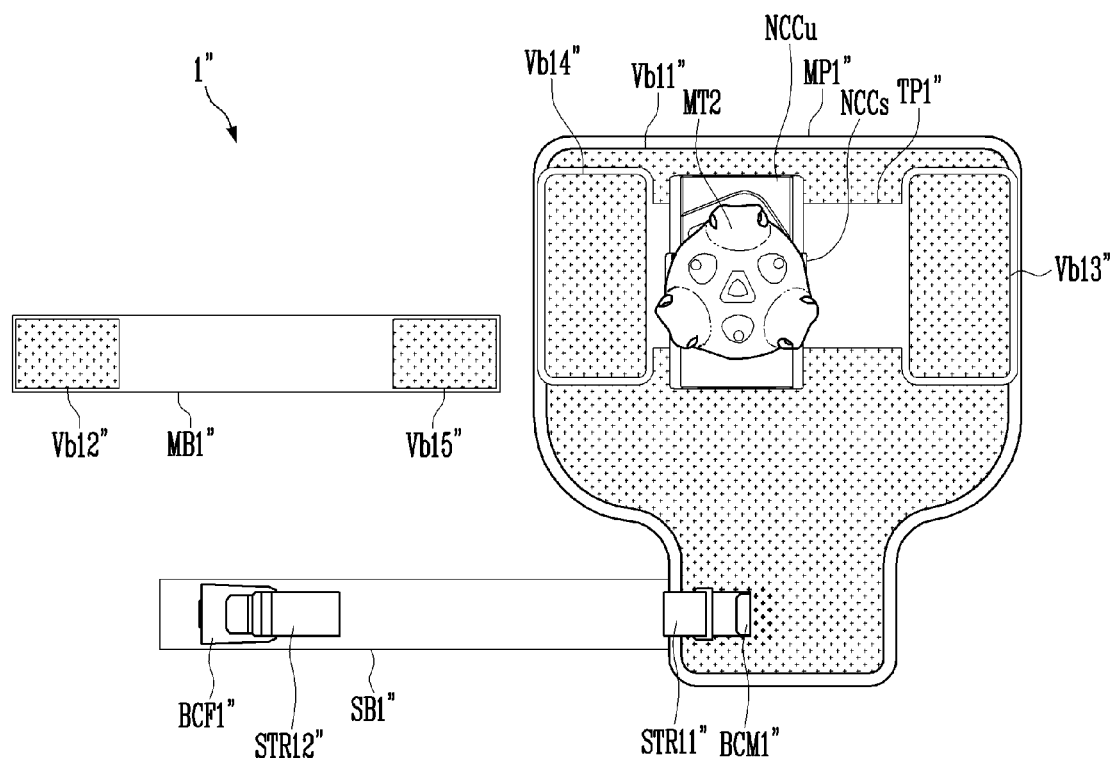
FIG. 31 is a view illustrating another modification of the tactile stimulation providing device of the first embodiment.
Figure 32:
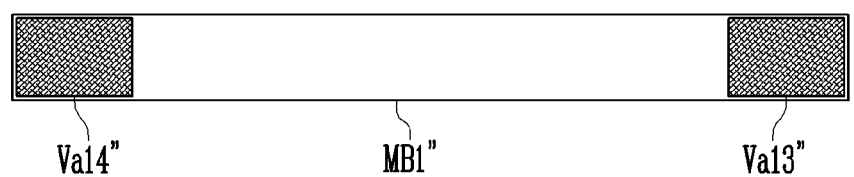
FIG. 32 is a view illustrating a lower surface of a first main band of FIG. 31.

FIG. 31 is a view illustrating another modification of the tactile stimulation providing device of the first embodiment. FIG. 32 is a view illustrating a lower surface of a first main band of FIG. 31.

In the tactile stimulation providing device 1" of FIG. 31, descriptions components overlapping with those of the tactile stimulation providing device 1' of FIG. 13 will be omitted. When comparing FIG. 31 with FIG. 13, the controller case CC1' is replaced with the controller case of FIG. 30.

As compared with FIG. 13, the tactile stimulation providing device 1" may further include attachable/detachable members Vb14", Vb15", and Va14", straps STR11" and STR12", and fastening members BCM1" and BCF1".

A fourth B-type attachable/detachable member Vb14" may be located at an upper surface in the vicinity of one end of a third layer member TP1". In addition, a fifth B-type attachable/detachable member Vb15" may be located at an upper surface in the vicinity of one end of a first main band MB1". The fourth B-type attachable/detachable members Vb14" may be located at a lower surface in the vicinity of the one end of the first main band MB1".

The user attaches a fourth A-type attachable/detachable members Va14" to the fourth B-type attachable/detachable members Vb14", to use the tactile stimulation providing device 1", similarly to the tactile stimulation providing device 1' of FIG. 13.

Referring to the wearing example of FIG. 16, friction may frequently occur between the first main band MB1" and a body part of the user and an external object (floor, etc.). Therefore, when the durability of the first main band MB1" is lowered, it is necessary to replace the first main band MB1". When the first main band MB1" is not replaced, actuators are not properly adhered closely to the body part of the user, and therefore, it may be difficult to provide a tactile stimulation.

According to this embodiment, the whole of the tactile stimulation providing device 1" is not replaced, but only the first main band MB1" that is a consumable product is replaced. Thus, the lifespan of the tactile stimulation providing device 1" can be lengthened.

A first strap STR11" may be located at an upper surface in the vicinity of one end of a sub-band SB1". An A-type fastening member BCM1" may be connected to the first strap STR11". A second strap STR12" may be located at an upper surface in the vicinity of the other end of the sub-band SB1". A B-type fastening member BCF1" may be connected to the second strap STR12".

The straps STR11" and STR12" may be made of a material having an elasticity smaller than that of the bands MB1" and SB1". For example, the straps STR11" and STR12" may be made of leather, cloth, cotton, etc. When the fastening members BCM1" and BCF1" have different types, the fastening members BCM1" and BCF1" are fastenable to each other. For example, each of the fastening members BCM1" and BCF1" may be a buckle. Also, for example, each of the fastening members BCM1" and BCF1" may have a structure in which a magnet is further included in the buckle.

According to this embodiment, the user may primarily fasten the sub-band SB1", using the attachable/detachable members, and then secondarily fasten the sub-band SB1", using the fastening members BCM1" and BCF1".

For example, when the heavy motion tracker MT2 is fastened to the controller case, it may be difficult to support the motion tracker MT2 with only adhesion of the existing attachable/detachable members. Thus, according to this embodiment, the stability of the tactile stimulation providing device 1" can be improved.

When the sub-band SB1" is fastened not using the attachable/detachable members but using only the fastening members BCM1" and BCF1", the user may have difficulty in fixing the sub-band SB1" with one hand. Therefore, the user primarily fastens the sub-band SB1", using the attachable/detachable members, and then secondarily fastens the sub-band SB1", using the fastening members BCM1" and BCF1", which may be most preferable in terms of user convenience or stability.

Figure 34:
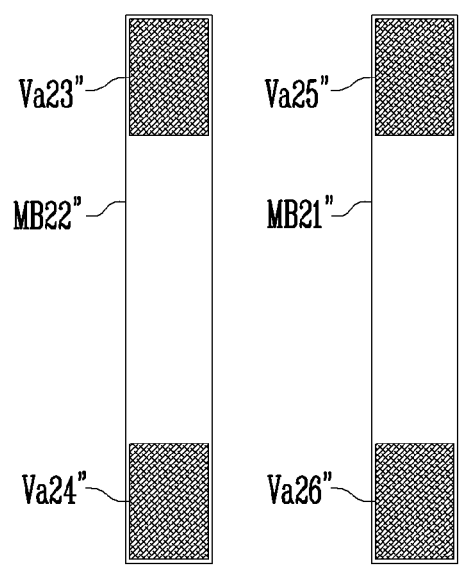
FIG. 34 is a view illustrating upper surfaces of first and second main bands of FIG. 33.
Figure 35:
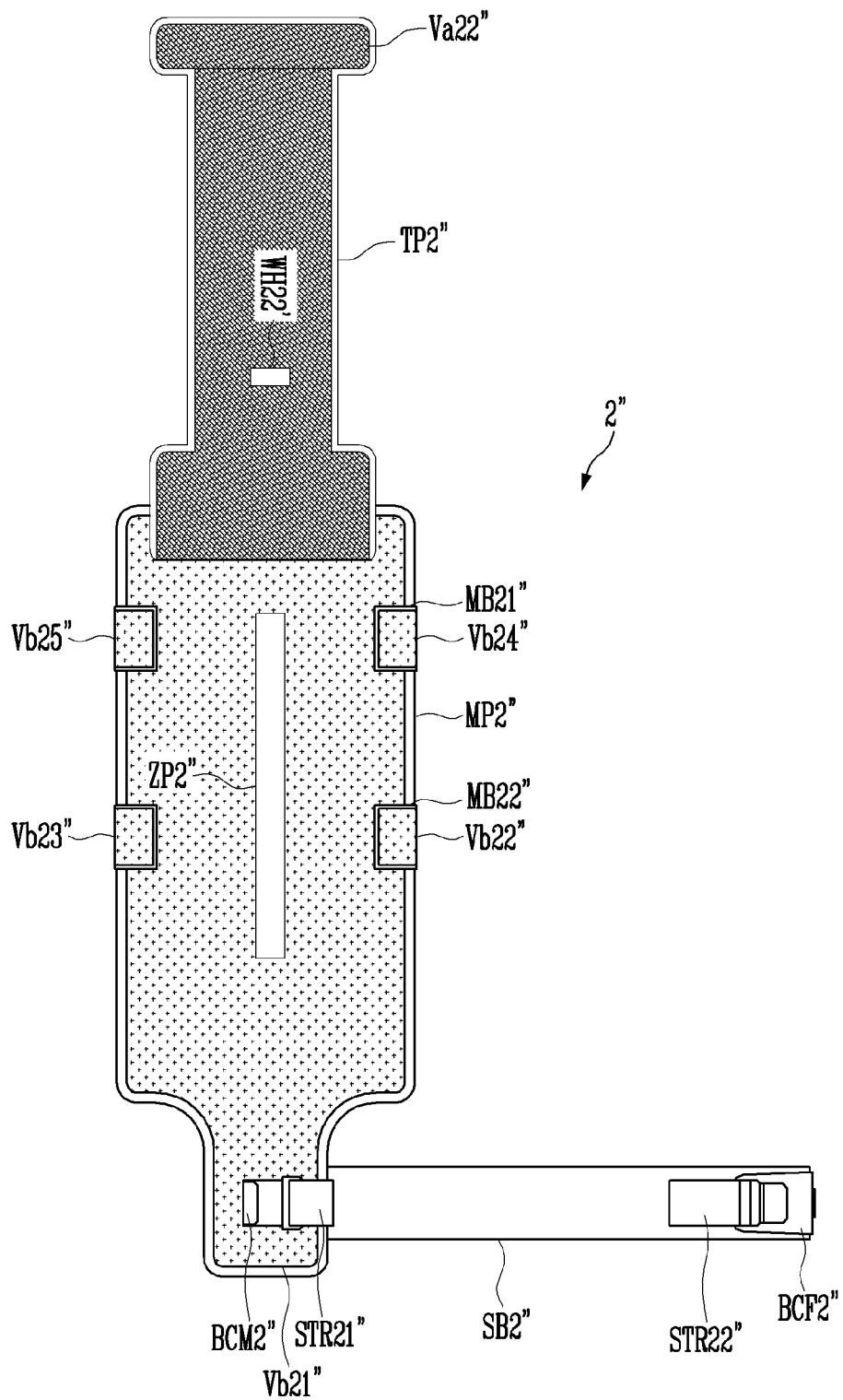
FIG. 35 is a view illustrating an upper surface of the tactile stimulation providing device of FIG. 33.

FIG. 33 is a view illustrating another modification of the tactile stimulation providing device of the second embodiment. FIG. 34 is a view illustrating upper surfaces of first and second main bands of FIG. 33. FIG. 35 is a view illustrating an upper surface of the tactile stimulation providing device of FIG. 33.

In the tactile stimulation providing device 2" of FIGS. 33 to 35, descriptions of components overlapping with those of the tactile stimulation providing devices 2 and 2' of FIGS. 19 to 25 will be omitted.

As compared with the tactile stimulation providing devices 2 and 2, the tactile stimulation providing device 2" may further include attachable/detachable members Vb22", Vb23", Vb24", Vb25", Va23", Va24", Va25", and Va26", straps STR21" and STR22", and fastening members BCM2" and BCF2".

In some embodiments, a second B-type attachable/detachable member Vb22" may be located at a lower surface in the vicinity of one end of a second main band MB22". A third A-type attachable/detachable member Va23" may be located at an upper surface in the vicinity of the one end the second main band MB22". A third B-type attachable/detachable member Vb23" may be located at a lower surface in the vicinity of the other end of the second main band MB22". A fourth A-type attachable/detachable member Va24" may be located at an upper surface in the vicinity of the other end of the second main band MB22".

In addition, in some additional embodiments, a fourth B-type attachable/detachable member Vb24" may be located at a lower surface of one end of a first main band MB21". A fifth A-type attachable/detachable member Va25" may be located at an upper surface of the one end of the first main band MB21". A fifth B-type attachable/detachable member Vb25" may be located at a lower surface in the vicinity of the other end of the first main band MB21". A sixth A-type attachable/detachable member Va26" may be located at an upper surface in the vicinity of the other end of the first main band MB21".

Referring to FIG. 35, the A-type attachable/detachable members Va23", Va24", Va25", and Va26" are attached to a first B-type attachable/detachable member Vb21", so that the first and second main bands MB21" and MB22" can be fixed. The thicknesses of a finger and a palm of each user hardly have a difference. Hence, in some embodiments, the first and second main bands MB21" and MB22" may be replaced with straps having an elasticity slightly smaller than that thereof.

As described with reference to FIGS. 31 and 32, according to this embodiment, the first and second main bands MB21" and MB22" that are consumable products can be replaced. Thus, the lifespan of the tactile stimulation providing device 2" can be lengthened.

A first strap STR21" may be located at an upper surface in the vicinity of one end of a sub-band SB2". The first strap STR21" may be made of a material having an elasticity smaller than that of the bands MB21", MB22", and SB2". An A-type fastening member BCM2" may be connected to the first strap STR21". A second strap STR22" may be located at an upper surface in the vicinity of the other end of the sub-band SB2". A B-type fastening member BCF2" may be connected to the second strap STR22". The effect caused by the straps STR21" and STR22" and the fastening members BCM2" and BCF2" refers to the descriptions of FIGS. 31 and 32.

The tactile stimulation providing device according to the present disclosure facilitates changing of its size, is firmly fixed to a body part of a user, and does not interfere with an input action of the user Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present disclosure as set forth in the following claims.

What is claimed is:

1. A tactile stimulation providing device comprising:
   actuators providing a tactile stimulation;
   a controller controlling the actuators;
   a controller case including the controller therein;
   a tracker supporting member having a portion fastenable to the controller case and another portion fastenable to a motion tracker sensing a motion of a user, and
   a bolt coupling the motion tracker to the another portion of the tracker supporting member.

2. The tactile stimulation providing device of claim 1, further comprising:
   an angle adjusting member fitted around the bolt.

3. The tactile stimulation providing device of claim 1, further comprising:
   a wearing part having a first layer member, a first side, and a second side that is an opposite side of the first side, wherein the actuators are disposed between the first side and the second side;
   a first main band having one end located in a vicinity of the first side of the wearing part and an other end fastenable to a vicinity of the second side of the wearing part; and
   a sub-band having one end located in a vicinity of a third side of the wearing part and an other end fastenable to the vicinity of the third side of the wearing part.

4. The tactile stimulation providing device of claim 3, wherein, when the first main band is fastened to the vicinity of the second side of the wearing part, the first main band and the actuators form a ring shape adapted to be adhered closely to a first body part of the user, and
   when the sub-band is fastened, the sub-band autonomously forms a ring shape adapted to be adhered closely to a second body part of the user, and
   wherein the first body part and the second body part are adjacent body parts connected to each other through a joint.

5. The tactile stimulation providing device of claim 3, wherein the wearing part further includes:
   a second layer member having at least a portion of an edge, which is coupled to the first layer member, on the first layer member, and
   wherein the actuators are disposed to be adhered closely to the first layer member.

6. The tactile stimulation providing device of claim 5, further comprising:
   bottom cases adhered closely to a lower surface of the first layer member; and
   top cases adhered closely to an upper surface of the first layer member, the top cases being coupled to corresponding bottom cases to fix corresponding actuators.

7. The tactile stimulation providing device of claim 6, further comprising:
   a plurality of A-type attachable/detachable members, wherein a first A-type attachable/detachable member among the plurality of A-type attachable/detachable members is disposed at a lower surface of the sub-band, and
   a plurality of B-type attachable/detachable members, wherein a first B-type attachable/detachable member among the plurality of B-type attachable/detachable members is disposed at an upper surface of the second layer member, and
   wherein the A-type and B-type attachable/detachable members are attachable to/detachable from each other.

8. The tactile stimulation providing device of claim 7, wherein the wearing part further includes a third layer member having one end connected to the second layer member on the second layer member, and
   wherein the tactile stimulation providing device further comprises a second A-type attachable/detachable member among the plurality of A-type attachable/detachable members disposed at a lower surface in a vicinity of an other end of the third layer member.

9. The tactile stimulation providing device of claim 8, wherein the controller case is fitted into the third layer member.

10. The tactile stimulation providing device of claim 9, wherein the second layer member includes a first wiring opening,
the third layer member includes a second wiring opening, and
the controller case includes a third wiring opening, and
wherein the actuators and the controller in the controller case are electrically connected by a wiring through the first wiring opening, the second wiring opening, and the third wiring opening.

11. The tactile stimulation providing device of claim 9, further comprising:
a second B-type attachable/detachable member among the plurality B-type attachable/detachable members located at an upper surface in a vicinity of the other end of the first main band; and
a third A-type attachable/detachable member among the plurality A-type attachable/detachable members located at a lower surface in the vicinity of the other end of the first main band.

12. The tactile stimulation providing device of claim 11, wherein the third A-type attachable/detachable member is attached to the first B-type attachable/detachable member, so that the first main band and the actuators form a ring shape.

13. The tactile stimulation providing device of claim 12, wherein the second A-type attachable/detachable member is simultaneously attached to the first B-type attachable/detachable member and the second B-type attachable/detachable member.

14. The tactile stimulation providing device of claim 13, wherein the first A-type attachable/detachable member is attached to the first B-type attachable/detachable member in the vicinity of the third side of the wearing part such that the sub-band autonomously forms a ring shape.

15. The tactile stimulation providing device of claim 3, further comprising:
a first strap located at an upper surface in a vicinity of the one end of the sub-band;
an A-type fastening member connected to the first strap;
a second strap located at an upper surface in a vicinity of the other end of the sub-band; and
a B-type fastening member connected to the second strap, wherein, when fastening members have different types, the fastening members are fastenable to each other.

16. A tactile stimulation providing device comprising:
actuators providing a tactile stimulation;
a controller controlling the actuators;
a controller case including the controller therein;
a tracker supporting member having a portion fastenable to the controller case and another portion fastenable to a motion tracker sensing a motion of a user;
a wearing part having a first layer member, a first side, and a second side that is an opposite side of the first side, wherein the actuators are disposed between the first side and the second side;
a first main band having one end located in a vicinity of the first side of the wearing part and an other end fastenable to a vicinity of the second side of the wearing part; and
a sub-band having one end located in a vicinity of a third side of the wearing part and an other end fastenable to the vicinity of the third side of the wearing part.

17. The tactile stimulation providing device of claim 16, wherein, when the first main band is fastened to the vicinity of the second side of the wearing part, the first main band and the actuators form a ring shape adapted to be adhered closely to a first body part of the user, and
when the sub-band is fastened, the sub-band autonomously forms a ring shape adapted to be adhered closely to a second body part of the user, and
wherein the first body part and the second body part are adjacent body parts connected to each other through a joint.

18. The tactile stimulation providing device of claim 16, wherein the wearing part further includes:
a second layer member having at least a portion of an edge, which is coupled to the first layer member, on the first layer member, and
wherein the actuators are disposed to be adhered closely to the first layer member.

19. The tactile stimulation providing device of claim 16, further comprising:
a first strap located at an upper surface in a vicinity of the one end of the sub-band;
an A-type fastening member connected to the first strap;
a second strap located at an upper surface in a vicinity of the other end of the sub-band; and
a B-type fastening member connected to the second strap, wherein, when fastening members have different types, the fastening members are fastenable to each other.

\* \* \* \* \*